(12) United States Patent
Falicoff et al.

(10) Patent No.: US 6,646,813 B2
(45) Date of Patent: Nov. 11, 2003

(54) OPTICAL TRANSFORMER FOR SMALL LIGHT SOURCES

(75) Inventors: Waqidi Falicoff, San Diego, CA (US); Juan C. Miñano, Madrid (ES); Yong Qiao, Acton, MA (US); Roberto Alvarez, South Pasadena, CA (US)

(73) Assignee: Light Prescriptions Innovators, LLC., Irvine, CA (US)

( * ) Notice: Subject to any disclaimer, the term of this patent is extended or adjusted under 35 U.S.C. 154(b) by 20 days.

(21) Appl. No.: 10/028,662

(22) Filed: Dec. 21, 2001

(65) Prior Publication Data

US 2002/0149924 A1 Oct. 17, 2002

Related U.S. Application Data

(60) Provisional application No. 60/257,725, filed on Dec. 21, 2000.

(51) Int. Cl.[7] .............................................. G02B 27/30
(52) U.S. Cl. ...................................................... 359/641
(58) Field of Search ................................. 359/641, 638, 359/615, 534, 542, 546, 737, 799, 800, 839, 850, 856, 857, 867, 127, 457, 742, 741, 257, 258, 709

(56) References Cited

U.S. PATENT DOCUMENTS

| | | |
|---|---|---|
| 4,643,515 A | 2/1987 | Upatnieks ..................... 359/10 |
| 4,726,641 A * | 2/1988 | Mori .......................... 385/39 |
| 4,767,172 A | 8/1988 | Nichols et al. ............. 385/146 |
| 4,798,448 A | 1/1989 | van Raalte |
| 5,432,876 A | 7/1995 | Appeldorn et al. |
| 5,486,940 A | 1/1996 | Fergason et al. ............ 349/122 |
| 5,526,190 A | 6/1996 | Hubble, III et al. ........ 359/719 |
| 5,546,481 A | 8/1996 | Meltz et al. |
| 5,757,557 A | 5/1998 | Medvedev et al. ......... 359/708 |
| 5,767,935 A | 6/1998 | Ueda et al. .................. 349/112 |
| 5,825,542 A | 10/1998 | Cobb, Jr. et al. ........... 359/487 |
| 5,877,874 A | 3/1999 | Rosenberg .................... 359/15 |
| 5,882,774 A | 3/1999 | Jonza et al. ................. 428/212 |
| 5,926,601 A | 7/1999 | Tai et al. |

(List continued on next page.)

OTHER PUBLICATIONS

Ditchburn, R.W., "Light", Dover Publications, Inc., New York, 1953, pp. 348–349.

Hecht, E., "Section 8.6: Polarization by Reflection" "Optics" 3rd Edition, Addison–Wesley Longman, Inc., Mehlo Park, CA, 1998, pp. 342–346.

Spigulis, J., "Compact Dielectric Reflective Elements. I. Half–Sphere Concentrators of Radially Emitted Light", Applied Optics, vol. 33, No. 25, Sep. 1994, pp. 5970–5974, plus two pages of notes dated May 10, 2001.

Primary Examiner—Hung Xuan Dang
Assistant Examiner—Joseph Martinez
(74) Attorney, Agent, or Firm—Law Offices of James D. McFarland

(57) ABSTRACT

Optical transformer devices described herein provide a variety of area output patterns from a small light source (21). A light ejector (24) is described for transversely ejecting light injected by a light source, including a plurality of partially reflective interfaces (41) arranged along a central axis (28), the interfaces arranged so that light injected by the light source travels through each of the interfaces, the reflected light providing an area light output of the light reflected. The interfaces may utilize Fresnel reflectance or may comprise metallic or dielectric coatings. A variety of embodiments are described, such as a cylindrical configuration, a rectangular block configuration, or an N-sided polygonal configuration. In some embodiments a turning reflector (132) and polarization retarder (131) are provided to reverse the direction of light and rotate polarization on the side opposite the light source. In one embodiment, a stripe ejector (470) can be used to illuminate an LCD display.

36 Claims, 25 Drawing Sheets

U.S. PATENT DOCUMENTS

| | | |
|---|---|---|
| 5,982,541 A | 11/1999 | Li et al. ..................... 359/497 |
| 6,031,958 A * | 2/2000 | McGaffigan ................ 385/146 |
| 6,101,032 A | 8/2000 | Wortman et al. ........... 359/500 |
| 6,234,656 B1 | 5/2001 | Hosseini et al. |
| 6,264,336 B1 * | 7/2001 | Epstein et al. .............. 359/606 |
| 6,267,492 B1 | 7/2001 | Reid et al. |

* cited by examiner

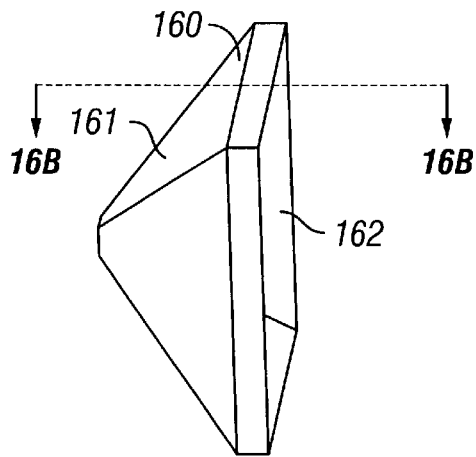 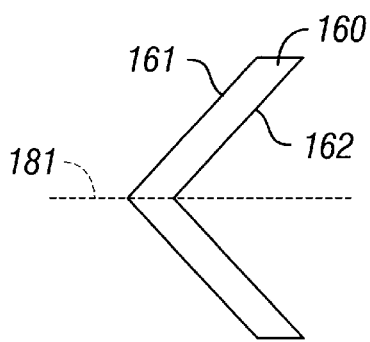
FIG. 16A          FIG. 16B
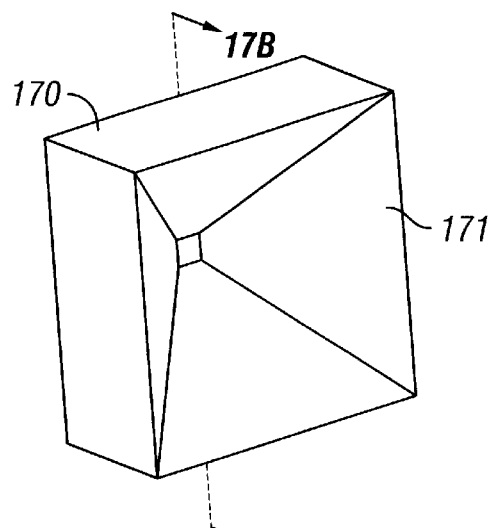 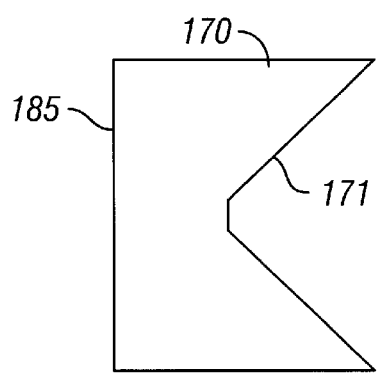
FIG. 17A          FIG. 17B

OPTICAL TRANSFORMER FOR SMALL LIGHT SOURCES

CROSS-REFERENCE TO RELATED APPLICATION

Priority is hereby claimed to U.S. Provisional Application No. 60/257,725 filed Dec. 21, 2000, entitled OPTICAL SYSTEM FOR TRANSFORMING A SMALL LIGHT SOURCE INTO A LINEAR OR AREA LIGHT EMITTER, by the same inventors as herein, which is incorporated by reference herein.

BACKGROUND OF THE INVENTION

1. Field of the Invention

The present invention relates generally to optical elements. More particularly, the present invention is related to optical devices used to transform a small or point light source into an area light emitter.

2. Description of Related Art

A generic problem in optical design is how to transform small or point sources of light into area light patterns such as linear or cylindrical. With the development of small, high brightness light sources such as inorganic and organic Light Emitting Diodes (LEDs), the problem of developing such optical systems has become particularly relevant. LEDs are typically very small—on the order of 0.25 mm to 0.50 mm on a side—and are very efficient and reliable. Furthermore, LEDs have been produced with luminous efficiencies of over 100 lumens/watt, and it is likely that LEDs will continue to improve as light sources. In order to take advantage of small high brightness light sources such as LEDs, research has now embarked on ways to utilize these light sources in applications that require linear and area light outputs.

SUMMARY OF THE INVENTION

Optical transformer devices are described herein that are useful for providing a variety of area output patterns from a small light source. Such devices can be made efficient, which advantageously provide low energy consumption and long battery life. Furthermore such devices can be reliable and manufactured at low cost. The optical transformers have a wide variety of possible uses such as room and task illumination, theatrical lighting, optical communications emitters, automotive lamps, biomedical light injectors, backlights and frontlights for LCD displays, and any application in which unusual and nonconventionally shaped light sources would be useful.

A light ejector for transversely ejecting substantially collimated light injected by a light source, comprises a plurality of partially reflective interfaces arranged along a central axis, the partially reflective interfaces also arranged symmetrically at a nonzero angle with respect to the central axis, so that substantially collimated light injected by the light source in a direction approximately longitudinally along the central axis travels through each of the partially reflective interfaces, providing an area light output that comprises light reflected from each of the partially reflective interfaces. The partially reflective interfaces may be arranged for providing Fresnel reflectance or may comprise metallic or dielectric coatings that provide partial reflectance.

A variety of embodiments are described. In one embodiment the length between adjacent interfaces is at least long enough so that light reflected from any of the interfaces does not interact with any adjacent interface. Embodiments are described in which the light ejector comprises a cylindrical configuration, a rectangular block configuration, or an N-sided polygonal configuration.

The light ejector may be formed of a plurality of stacked cones, each cone comprising a male end and a female end, the plurality of cones stacked so that the junction between a male end of one cone and a female end of an adjacent cone defines the partially reflective interface.

In one embodiment the interfaces comprises a zigzag configuration, each interface comprising an inner interface proximate to the central axis and an outer interface distal from the central axis, the inner interfaces angled to eject light traveling in a first longitudinal direction, and the outer interfaces angled oppositely to eject light traveling in a second, opposite longitudinal direction. In one such embodiment the light ejector comprises a cylindrical configuration, and the light source provides an annular beam that is injected into the outer interfaces along the second direction, and further comprises a turning reflector formed on the ejector on the side opposite the light source, the turning reflector having a configuration to reverse direction of the injected beam along the first direction and redirect it into the inner interfaces.

In some embodiments, on the side opposite the light source, a turning reflector is provided arranged to reverse the direction of light incident thereon. In addition, some such embodiments also comprise a polarization retarder situated to rotate polarization of longitudinally traveling light. The polarization retarder may comprise an optically active material, or a Kerr device, a Pockels device, or a Faraday effect device. An embodiment is described in which the turning reflector and polarization retarder comprise a grooved reflector. The grooved reflector may comprise a spiral configuration or a plurality of parallel grooves.

An embodiment is described in which the ejector comprises a stripe ejector in which the partially reflective interfaces are parallel and angled to provide an output configuration in the shape of approximately a stripe. The stripe ejector can be used with a holographic optical component arranged to receive the stripe output and direct it to an LCD display, thereby front lighting the LCD display.

Still other embodiments are described in which the interfaces are formed in a sawtooth configuration, the ejector including an upper plate that has a plurality of rows of teeth, and a lower plate has a plurality of rows of teeth that engage with the teeth in the upper plate.

The ejector can be used by itself or with other optical components. In one embodiment, an annular reflector is arranged around the ejector to receive light output from the ejector and redirect it to provide an emitter.

The ejector described herein can be adapted for a wide variety of uses. For example the ejector can be designed to transform randomly polarized light sources into complex of linearly polarized sources. The ejector can be designed to create a wide range of geometric-shaped beam patterns such as triangle, rectangle, and N-sided polygons from collimated light sources. The ejector can be employed in high speed optical communication emitters that are inherently susceptible to noise from phantom radiation sources.

BRIEF DESCRIPTION OF THE DRAWINGS

13For a more complete understanding of this invention, reference is now made to the following detailed description of the embodiments as illustrated in the accompanying drawing, wherein:

FIG. 16A is a perspective view of a primary component for the pyramidal block ejector;

FIG. 16B is a cross-sectional view of a primary component for the pyramidal block ejector shown in FIG. 16A;

FIG. 17A is a perspective view of an end component for the pyramidal block ejector;

FIG. 17B is a cross-sectional view of an end component for the pyramidal block ejector;

DETAILED DESCRIPTION

Figure 1:
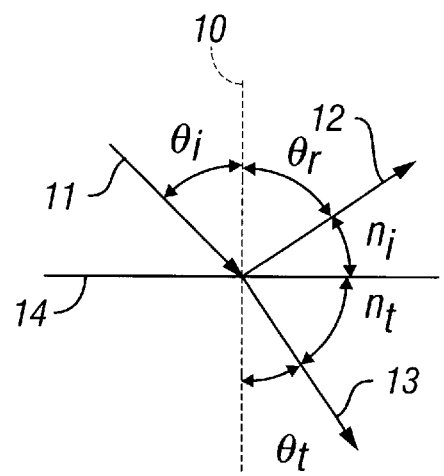
FIG. 1 is a diagram illustrating Fresnel reflection at an interface.

This invention is described in the following description with reference to the figures, in which like numbers represent the same or similar elements.

Glossary of Terms and Acronyms

The following terms and acronyms are used herein:

Area light emitter an emitter that emits light over any predefined area, including for example linear emitters and large area emitters.

Collimated Light: A light beam in which the rays in the beam propagate approximately parallel.

Light: any electromagnetic radiation at any wavelength, for example visible, infrared, or ultraviolet light.

Linear Ejector: any of a group of area light ejectors whose structure is arranged about a linear axis to eject light in a direction not aligned with the axis. Examples include the cylindrical ejectors and block ejectors described herein.

Overview of Devices

By creating an optical system that has successively changing or alternating transparent or translucent media, which makes use of partial reflections at each of a series of interfaces, a wide variety of light outputs can be achieved using a small light source. The partially reflective interface may be provided by Fresnel reflection, or other reflective technique such as metallic or dielectric layers. A wide variety of optical devices can be designed using a series of partially reflective interfaces. The optical devices described herein include:

A collimator (see FIG. 33) or other small solid angle light output device that takes the light from the small source and injects it into a linear Fresnel ejector.

A linear Fresnel ejector (so named in this invention—see FIGS. 4, 5 and 6 for example), comprising of a stack of light ejecting cells or components that are bonded together with a material with an index of refraction that differs from these components. Light is then reflected by the interfaces to the outer surfaces of each ejector cell, which can either be smooth or be made to have a variety of surface properties for redirecting the light to the surroundings in a number of output profiles. The light ejected from the ejector can be further modified by optional components that may include one or more of the following:

1) One or a series of conical, pyramidal or n-sided polygonal or other shape reflectors (see FIG. 26), which can be radially symmetric or asymmetric in shape. The linear Fresnel ejector can be located at any position within the reflector or reflectors, but is typically located such that the central or predominant axes of both devices are in alignment.

2) One or more stationary or movable external opaque, translucent or transparent hollow sleeves that are outside of the linear Fresnel ejector. These sleeves can have slits, holes and a wide variety of shapes in them, the purpose of which is to redirect the light into desired light patterns. The sleeves can take a number of forms that include but are not limited to cylinders, extrusions of n-polygons, ellipses and other conic sections, to name a few. The overall geometry of the sleeves can be radially symmetric or asymmetric in shape.

3) One or more annular rings of variable size, height and geometry that are composed of similar materials to the linear Fresnel ejector. The annular rings are bonded together with a material, which creates interfaces with changes in index of refraction. Light rays striking these interfaces are redirected parallel or roughly parallel to axis of the linear Fresnel ejector associated with this device. This device to be named the Annular Area Fresnel Ejector (see FIG. 29) can be of a variety of shapes. The most common shape of the Annular Area Fresnel Ejector is circular in plan but rectangular, n-polygonal, asymmetrical shapes and other shapes are all possible. The slopes of the annular rings can be of any angle, but 45° is common for most applications. Each side of a ring can be set at a different angle and the thickness between the rings can either be constant or variable. The top surface of the rings, which ejects the light, typically is perpendicular to the axis of the linear Fresnel ejector associated with the device. However, each top surface can be individually shaped to redirect light in a specific manner. One purpose of the Annular Area Fresnel Ejector is to turn the linear light source from the linear Fresnel ejector into an area source.

An optional Circular Retarder or Polarization Rotator device (see FIGS. 13, 14, 15, 20, 24 and 25) can be used to turn the state of polarization of certain light "rays" 90°. This device can be used in a number of ways in the present invention. A primary use in the linear Fresnel ejector is for changing the state of polarization of the light that is transmitted to the end of an ejecting stack without being ejected, from the longitudinal state to the transverse state. The device in various forms is also optionally used in the Annular Area Fresnel Ejector (see FIG. 30). The Circular Retarder is typically used in conjunction with a turning device and is designed to work with it and the geometry of the Ejector.

An optional 180° reverse Turning Reflector (see FIGS. 8, 11, 13, 14, 15, 20, 24 and 30) that takes all or most of the light which has made it to the end of a stack without being ejected and either turns it around and sends it back down the same stack or redirects into a new stack. The Turning Reflector typically is used in conjunction with the Circular Retarder device.

Overview of Operation of Devices

In one example, an optical device described herein operates as follows. First, the Collimator or other type of Injector inputs light into the linear Fresnel ejector from either one or both ends of the device. The injected light can fill all or parts of the cross section of the entrance to the linear Fresnel ejector. For example, the light input can be annular in shape thus only striking the outer surface of the linear Fresnel ejector. A number of novel Collimators and Injectors are described in detail later in this document and are considered part of the present invention. See FIGS. 33, 34, 35, 36, 38, 39 and 40 for examples of such Collimators.

A fraction of the collimated or near-collimated light is ejected at each interface of the stack via Fresnel reflection due to the differences in the index of refraction between two transparent solid dielectric layers or through partial reflection due to interaction with a thin metallic or dielectric layer. (See FIGS. 5 and 6, for example) The angle of the ejection surface and the incidence angle of the ray striking the interface determine the direction where the light will be ejected. For example, collimated injected light, which is parallel to the ejector axis and which strikes a surface that is at a 45° angle, will be ejected perpendicular to the axis of the ejector (see FIG. 5), however, other ejection angles are contemplated.

Figure 5:
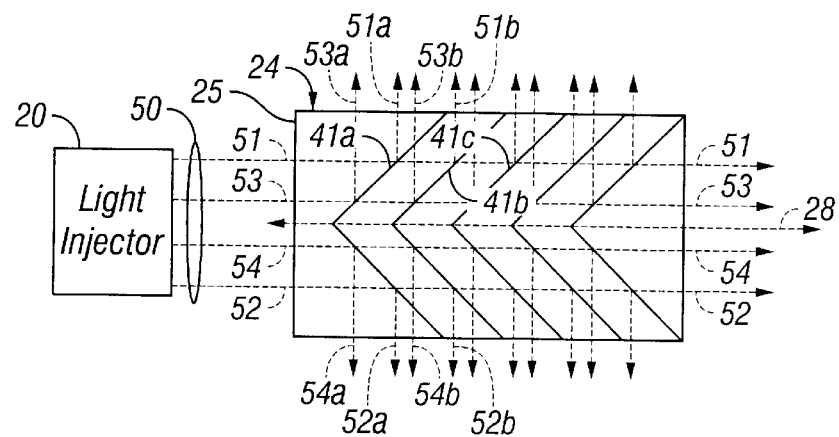
FIG. 5 is cross-sectional view of an ejector that receives an ideally collimated beam 50 from the injector.
Figure 6:
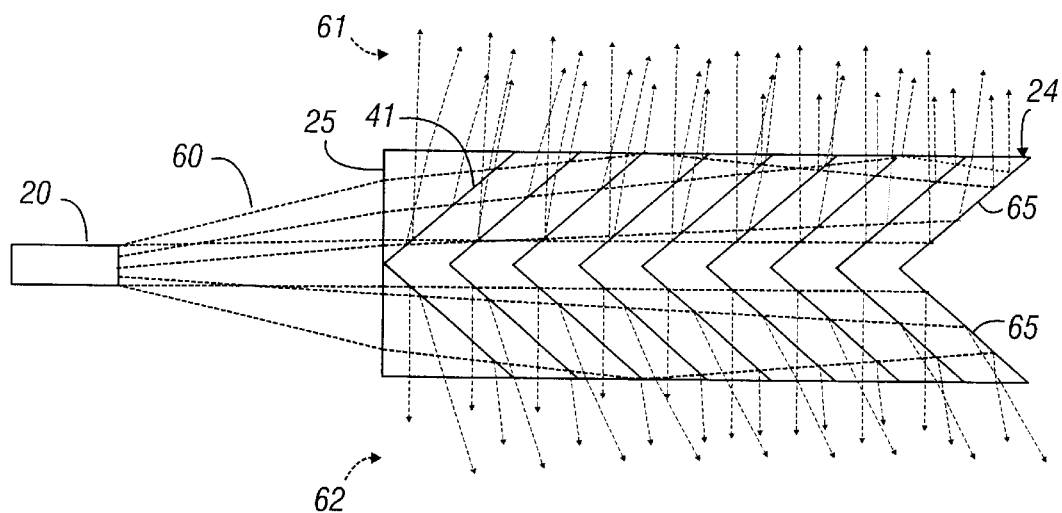
FIG. 6 is a cross-sectional view of the ejector 24 that receives a substantially collimated beam from the light injector.

In the case of a cylindrical linear Fresnel ejector, the light will be ejected in a radial pattern (see FIGS. 5 and 6). In addition, this light will be to some extent polarized in the transverse direction. (The degree of polarization is a consequence of the type of material used at the interfaces. Polarization will typically not be affected if a metallic layer is employed. Some degree of polarization change will take place if transparent solid dielectric materials are used.) Therefore the output will be somewhat spatially coherent. If the outer surface is not smooth, the directional characteristics of the output light will be altered. For example, if a diffuser is placed on the outside surface, a wide variety of spatial outputs can be achieved depending on the angular characteristics of the diffuser. Prismatic or other structures on the outside of the ejector (they can be added on or molded into the outer surface) can be used to create a diversity of outputs.

The angular output of the ejector is roughly perpendicular to the axis in all directions in one embodiment of the present invention. This output can be constrained by a number of means. First, one can slice the ejector along the long axis. For example, a 180° output can be achieved by slicing in half a cylindrical linear Fresnel ejector (along the long axis) and using only one half of it. Secondly, one can use reflective or opaque wraps or sleeves on the outside of the ejector with full-length slits. The slit geometry will define the angular output of the ejector, and therefore, the system can produce linear sources of light with a wide variety of outputs from collimated spatially coherent light to diffuse light, exhibiting Lambertian characteristics.

Light that has reached the end of the stack without being ejected will be partially polarized in the longitudinal direction. (This typically is not accurate for embodiments that utilize metallic layers to provide partial reflectance.) This light is not as easily ejected (Fresnel reflected) as is transversely polarized light. In order to reintroduce the remaining light for ejection purposes, the light first has to be either be turned around and sent back from whence it came or be redirected to another ejection stack. The redirecting of the light is accomplished via the Turning Reflector device. However, as the light is to some degree longitudinally polarized, the state of polarization must also be turned 90° via the use of a circular retarder. There are a number of circular retarders that are commercially available and that have been identified in the literature. Where it is appropriate, this invention describes new retarders and retarder configurations, which are designed specifically to work with the other components of the present invention. These are all deemed to be part of the invention.

The linear light output from the linear Fresnel ejector can be transformed into an area source (strictly speaking the linear ejector does have some area to it depending on the overall lateral dimensions of the device) by use of the Annular Area Fresnel Ejector (see FIGS. 29 and 30) or a traditional reflector. The latter case is well understood and is widely used in practice. One advantage of the light output from a linear Fresnel ejector is that it can be highly organized. For example, if the light emitted by a cylindrical linear Ejector is radially organized with the ray planes normal to the axis of the ejector, then it is very easy to design a conical reflector which collimates the light in the direction of the axis of the cone. Assuming the axis of the reflector is the same as that of the ejector, a 90° cone will accomplish this. On the other hand, the ray bundle emitted from the conical reflector can easily be made to converge or diverge, by setting of the appropriate opening angle of the cone. (See FIG. 27.)

The Annular Area Fresnel Ejector works similarly to the linear ejector by using Fresnel reflections at the interfaces. However, the Area Ejector is ostensibly being "fed" radial sets of rays by the linear ejector over the entire length of the linear ejector. Therefore, this volumetric set of rays can be easily converted by Fresnel reflections into an area source. The shape of the area source is controlled by adjusting the individual shape of the annular rings and the cross-sectional shape of the device. The light output from such a device can be further modified by adjusting the angle, shape and surface properties of the external emitting surfaces. For example, if this type of device was used for a car headlamp, top segments of the annular rings could be stepped to redirect light by refraction in the required directions. As was mentioned earlier, further refinements can be achieved by using curved instead of planar stepped adjustments on the tops of the annular rings. (See FIG. 29.)

The light emitted from the area ejector can also be modified by similar means stated earlier in conjunction with the linear ejector. For example, the outer surfaces can be finished with a diffuse surface or with prismatic structures. Further, other secondary coverings can be used such as apertures or area coverings with various shape openings or obstacles.

The Annular Area Ejector can include similar devices as the Linear Ejector, namely, a Turning Reflector and/or a Circular Retarder. The geometry of these devices however must be different to accommodate the volumetric aspect of the Area Ejector. In this case, the reflector surrounds the body of the ejector. In plan, the reflector is annular in shape (see FIG. 30) and mimics the cross-sectional shape of the device. In addition, to this reflector, there is an outside circular retarder. For example, for the case of a circular area ejector the circular retarder is in the shape of a half height cylinder surrounding the circle. In this example, the turning reflector is V-shaped device, which has been swept 360° around the outside of the circle. The height of the V-shape is the height of the device in the direction of the axis of the linear ejector. For reasons, which will be described below in conjunction with FIG. 30, the area ejector may also use a second circular retarder to modify the state of polarization for some or all of the rays.

Device Characteristics and Alternatives

Robust and unique devices are described that convert small sources of light into linear and area sources of light of infinite variety of shapes and size. A wide variety of device characteristics can be achieved; examples of such device characteristics include:

1. The ability to create collimated linear and area light sources from small or near point sources of light.

2. The ability to create highly controllable sharp cutoff beams of light of a wide variety of shapes and sizes.
3. The ability to create highly efficient linear and area illuminators, which can provide good spatial coherence and which can have variable and controllable states of polarization.
4. The ability to create directional illuminators that can be easily fine-tuned to create complex light distribution profiles for applications such as vehicular headlamps, theatrical productions, etc.
5. The ability to create light sources which have variable light distribution with time for such application as signage, cinematic productions, and so forth.
6. The ability to create optical emitters for optical communication systems that can achieve very high frequency with both amplitude and polarization modulation

Discussion of Fresnel Reflection

Reference is now made to FIG. 1. Fresnel reflection is the result of a well-established optical principle that when a ray 11 of light traveling in a transmissive media that has an index of refraction of $n_i$ strikes an interface 14 with a second transmissive media that has a different index of refraction $n_t$, at an angle $\theta_i$ with respect to the normal axis 10, a fraction of the incident light will be reflected at the interface 14 as shown by a reflected ray 12 at an angle $\theta_r$ opposite and equal to the angle of incidence $\theta_i$ of the ray. Although "Fresnel reflection" is quite often considered a nuisance for many optical designers, in some instances it can be useful. The Fresnel reflection effect is illustrated in FIG. 1. Fresnel reflection is a form of partial reflection: i.e. a portion of the incident ray 11 is transmitted through the interface 14 to provide a transmitted ray 13 that is refracted to an angle $\theta_R$ with respect to the normal axis 10

Fresnel reflections occur at virtually every interface in lens-based optical systems where refraction is employed. Thin coatings, called anti-reflective ("AR") coatings, may be used to reduce the Fresnel reflections. The Fresnel reflection component is small where there are small differences in the index of refraction of the transmissive optical materials and where the incidence angle of the rays are small. The Fresnel reflection component grows as the difference between the index of refraction of the media is increased and the incidence angle is increased. At a certain angle all of the light is reflected, which is a phenomenon called "total internal reflection".

The equations used for calculating Fresnel reflections are well understood and can be summarized below with an example in which a first transmissive media with an index of refraction of 1.62 ($n_i$) is in contact with a second material with an index of refraction of 1.48 ($n_t$). The angle of incidence $\theta_i$ of the ray is about 45° and the ray is initially in the first media, which has the higher index of refraction. Because Fresnel equation is different for different states of polarization, the incident light is characterized in terms of its polarization. In the example, it is assumed that the light source has equal amounts of polarized light. In this case, the Fresnel reflection at the interface is approximately 0.5% of the energy of the incidence light. This light will be reflected at a reflected angle $\theta_r$ of 45° from the interface. The remainder of the light energy is refracted into the second media at an angle of about 50.714°.

$$\theta_t = a\sin\left(n_i \frac{\sin(\theta_i)}{n_t}\right) = 50.714°$$

$$r_p = \frac{n_i \times \cos(\theta_i) - n_t \times \cos(\theta_t)}{n_i \times \cos(\theta_i) + n_t \times \cos(\theta_t)} = 0.1$$

$$r_{pa} = \frac{n_t \times \cos(\theta_i) - n_i \times \cos(\theta_t)}{n_i \times \cos(\theta_i) + n_t \times \cos(\theta_t)} = 0.01$$

$$Fresnel reflection = \frac{r_p^2 + r_{pa}^2}{2} = 5.056 \times 10^{-3}$$

In another example, if the index of refraction of the two materials is changed to 1.71 and 1.49, which increases the difference in the index of refraction at the interface, the Fresnel reflection component will then be increased to 1.4%. If in addition to increasing the index of refraction the angle of incidence is increased to 52.5°, then the reflectance becomes over 4%.

DETAILED DESCRIPTION

Linear Cylindrical 360° Radiating Source From a Collimated Small Source

Figure 2:
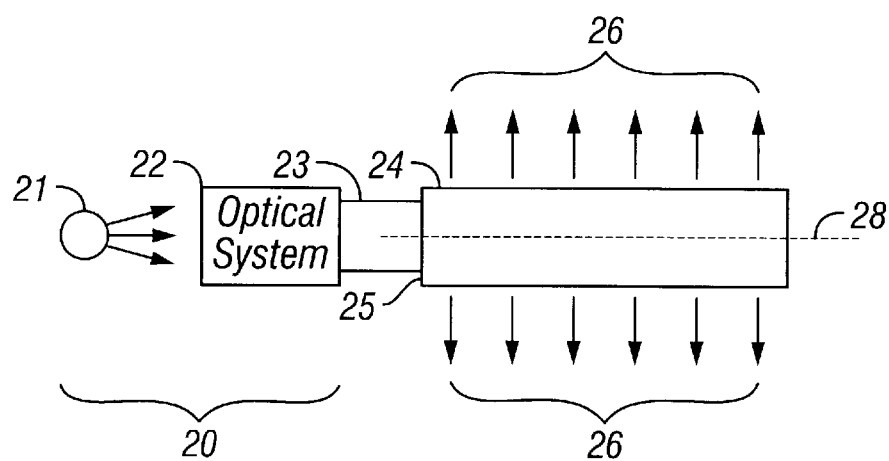
FIG. 2 is a schematic diagram of an ejector that receives collimated light and provides an output transversely to the ejector.

Reference is now made to FIG. 2. A collimated light injector 20 including a small light source 21 and an optical device 22 provides a substantially collimated light beam 23 to an ejector 24 through an entrance 25. The ejector 24 comprises a series of partially reflective interfaces, as described herein, which reflect the light beam 23 to provide a light output 26. The injector 20 includes any suitable light source, chosen depending upon factors such as cost constraints, device design and illumination requirements. In the embodiment shown in FIG. 2, light from the small source 21 such as an LED is first collimated or partially collimated by suitable optical designed components 22. In some embodiments the ejector 24 is designed symmetrically around an axis 28, such as in the shape of a cylinder. In such embodiments the substantially collimated light 23 is directed along the axis 28 of the ejector and the light output 26 may be approximately uniform around the circumference of the cylinder.

Figure 3:
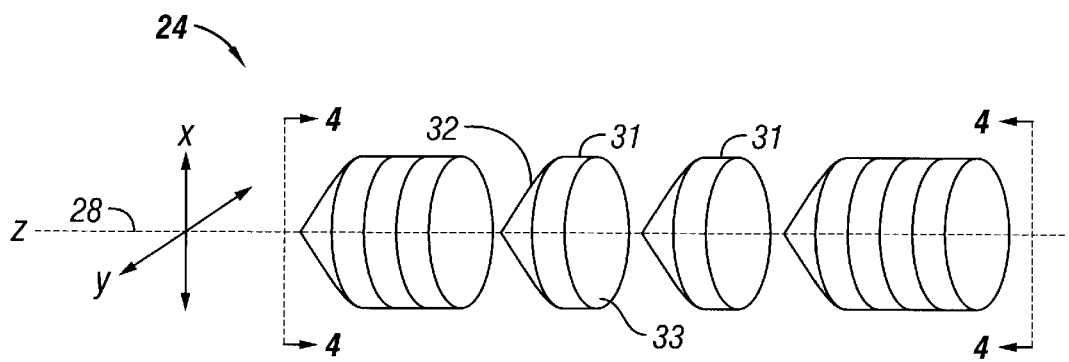
FIG. 3 is a perspective view of one embodiment of a cylindrical ejector.
Figure 4:
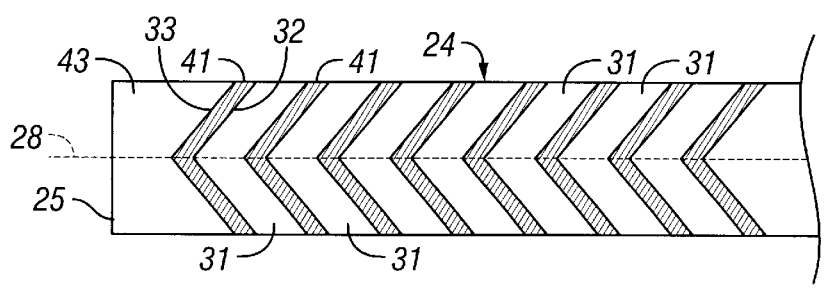
FIG. 4 is a cross-sectional view of the cylindrical ejector of FIG. 3.

Reference is now made to FIGS. 3 and 4 to show one embodiment of the ejector 24. Particularly, FIG. 3 is a perspective view of one embodiment of the ejector 24, and FIG. 4 is a cross-sectional view. In this embodiment, which is cylindrically symmetrical about the axis 28, the ejector 24 comprises a stack of double cones 31 that are extruded along their axes to define a male end 32 on one side and hollowed out on the other side to provide a female end 33. In one embodiment both the male and female ends of the double cones 31 are symmetrically configured at approximately a 90° angle with respect to the axis 28.

The double cones 31 are bonded together axially along the axis 24 to so that the male and female ends meet to provide a series of junctions at which a partially reflective interface 41 is defined. In one embodiment the partially reflective interface 41 is provided by bonding the cones together with an adhesive material that has an index of refraction different than the material of the cones. Thus, in such embodiments the partial reflectance is provided by Fresnel reflection at the interface between the cone and the adhesive. In alternative embodiments, the partial reflectance may be provided by partially reflective coatings, such as metallic or dielectric coatings on either or both of the male and female surfaces.

In summary, in this embodiment, the partially reflective optical interfaces 41 are defined by a stack of cones.

In some embodiments, such as shown in FIG. 4 in cross-section, an entrance cylinder 43 comprises a flat surface on its entrance 25 that is substantially perpendicular to the optical axis 28. The entrance cylinder also includes a conical female end 33 that meets an adjacent male end 32. The flat entrance surface 25 of the entrance cylinder 43 ensures that the collimated light passing through is not substantially reflected or substantially refracted at an angle, and therefore the incident ray and strikes the first interface at the correct angle of incidence. At the opposite end of the ejector 24, an end cylinder 44 may comprise any of a variety of shapes.

In alternative embodiments, the reflective interfaces may be defined by other structures. For example conical segments could be cut from a solid cylindrical material leaving a solid central core, and then the interstitial material is placed in the gaps and cured using various methods to produce either a single index of refraction material or a slowly varying one that provides the partially reflective interfaces.

FIG. 3 discloses a cylindrical configuration, in alternative embodiments other geometric configurations can be employed to provide a series of partially reflective interfaces, for example pyramidal configurations can be utilized that provide a series of partially reflective surfaces and perform similarly to the aforementioned cylindrical male/female conical configuration. Some examples are described elsewhere in this application for example at FIGS. 18 and 23.

In the drawing of FIG. 3 the axis for the light entering the optical ejector is the z-axis 28 (which is the cylindrical axis) and the entrance face 25 is on the X-Y plane of the drawing. The partially reflective (e.g. adhesive or secondary) interface layers 41, shown in FIG. 4, can be very thin, on the order of less than a thousandth of an inch. The thickness of the interface layer can be useful as it can be either used to diverge or converge the light rays or have little effect at all (such as would be the case with a very thin partially transmissive metallic layer. The thicker the interface layer is, the more it will refract the light bundle in a lateral direction.

The pattern of the output light 26 (FIG. 2) is dependent upon a variety of factors, such as extent to which the injected beam is collimated, the configuration of the partially reflective interfaces including their angle, and the amount of reflectance provided by each partially reflective interface.

Reference is now made to FIGS. 5 and 6. FIG. 5 is cross-sectional view of an ejector 24 that receives an ideally collimated beam 50 from the injector 20. FIG. 6 is a cross-sectional view of the ejector 24 that receives a substantially collimated beam 60 (e.g. 15° half-angle) from the light injector 20. The output light pattern will be different depending upon whether the light injector 20 provides a fully collimated beam (as shown in FIG. 5) or a partially collimated (as shown in FIG. 6).

In FIG. 5, the ideally collimated beam 50 defines a plurality of parallel rays, including outer rays 51 and 52 and centrally-positioned rays 53 and 54. The illustrated rays are used to illustrate operation of the ejector. FIG. 5 shows the collimated annular light beam 50 entering the ejector 24 through the flat entrance 25. Looking first at the upper outer ray 51, after entering through the entrance 25, it then partially reflects upward from a first partially reflective interface 41a as shown by a ray 51a. The non-reflected portion of the ray 51 continues on to a second interface 41b, where it is again partially reflected upward as shown by a ray 51b, and the non reflected portion continues on to a third interface, and so forth through the remainder of the ejector. Similarly, the upper central ray 53 enters through the entrance 25, is partially reflected upward from the first interface 41a, as shown by a ray 53a. The non-reflected portion then continues on to the second interface 41b, where it again is partially reflected upward as shown by a ray 53b, and the non-reflected portion continues on to the third interface 41c, and so forth.

Due to the symmetry of the design, the lower outer ray 52, which is substantially parallel to the upper outer ray 51, is reflected similarly only in the opposite direction, i.e. downward rather than upward. Particularly, the lower outer ray 52 enters through the entrance 25, is partially reflected downward from the first interface 41a as shown by a ray 52a. The non-reflected portion continues on until it is partially reflected as shown by a ray 52b from the second interface 41b, and the non-reflected portion continues on to the third interface 41c, and so forth. Similarly, the lower central ray 54 enters through the entrance 25, is partially reflected from the first interface 41a as shown by a ray 54a, the non-reflected portion continues on until it is partially reflected from the second interface 41b as shown by a ray 54b, and so forth through each of the remain interfaces.

The resulting light output from the ejector 24 is the sum of all the rays in the collimated beam 50, with the rays coming out perpendicular to the z-axis 28, appearing to be an approximately uniform cylindrical source. If the light source is less collimated, such as described with reference to FIG. 6, then the light output of the ejector 24 is less directional and has a larger angular output spread.

In alternative embodiments additional optical structures may further process the output from the ejector 24. For example, the optical design could include prismatic or diffuser surfaces on the "outer" surface of the conical components of the ejector 24. These surfaces could be manufactured into the appropriate surfaces of the components at the time of the injection molding or done after the fact by using polishing or etching processes before or after the conical optical components are bonded together. For example, diffusing or scattering surfaces could be used to create a Lambertian output or to create outputs with more directional characteristics. Similar outputs and other type outputs can be achieved through the use of various type prismatic structures or holographic elements on the outside surface.

FIG. 6 is a cross-sectional view of an ejector 24 that receives a partially collimated beam 60. Particularly, FIG. 6 shows the result of the ray tracing analysis using an annular light source with a half-angle of 15° on an ejector 24 with a conical configuration such as shown in FIG. 5. The analysis was performed using a commercially available Monte Carlo ray tracing software package. As can be seen, an upper light output 61 is emitted generally at a nonzero angle to normal and exhibits many diverging rays, and similarly, a lower light output 62 is emitted generally at a nonzero angle to normal and exhibits many diverging rays. At the opposite end from the source, the cylindrical ejector in FIG. 6 comprises a totally reflective surface 65 that redirects any remaining light back into the ejector.

If the interfaces 41 are approximately equally partially reflective as a percentage, then the light output slowly decreases from one interface 41 to the next (i.e. with each succeeding interface 41, the amount of reflected light is smaller because the remaining transmitted light energy is less), except at the last interface where the rays are in contact with the air where because of total internal reflection all the remaining light is ejected from the device. To achieve a more uniform output from each interface a number of approaches can be employed. For example, in embodiments that utilize Fresnel reflection, the index of refraction of the secondary "adhesive" material may be made to be slowly decreasing at each successive interface layer, so that the fraction of the incident beam that is reflected is increased at each layer. If the fractional increase matches the loss of the main ray bundle then an approximately uniform output can be achieved. A method for doing this is presented, for example with reference to FIG. 32. Another method for creating increasing reflectivity using a partially transmissive metallic layers is to increase the thickness of each successive layer, thereby increasing reflectivity by the required amount at each successive layer.

Another way of modifying the light output, which can be used to make the output light more uniform is to slowly vary the angle of the cone for each successive component, thereby increasing the Fresnel reflectance for each successive interface. This can be accomplished by making the cone angles of male and female parts of the components to be different. If the total cone angle decreases (less than 90°), then the Fresnel reflections will increase (as the incidence angle increases) and thus approximately uniform output is achieved. However, in this approach the angle of ejection slowly changes. This may either be desirable or not depending on the requirements of the optical application.

Figure 7:
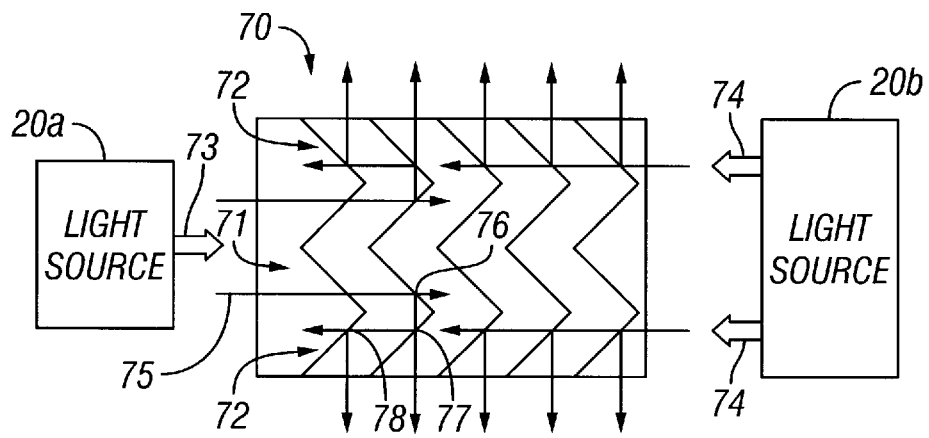
FIG. 7 is a cross-sectional view of a zigzag ejector.

Another way of modifying the output, which can be used to increase uniformity is to use two sources of light, one from either end of oppositely facing conical configurations,. By using a more elaborate geometry for the "conical" geometry combined with slightly different optical injectors a near uniform ejection source can be achieved. In FIG. 7 there is a sketch of a design that can accomplish this.

Reference is now made to FIG. 7, which is a cross-sectional view of a zigzag ejector 70 that includes a group of inner interfaces 71 that operate similarly to the interfaces 32 (FIGS. 3 and 4) and a group of outer interfaces 72 oppositely facing from the inner interfaces 71. A first light source 20a is arranged to provide a substantially collimated beam 73 to the inner interfaces 71. A second light source 20b is arranged to provide a substantially collimated beam 74 to the outer interfaces 72, and accordingly the second light source 20b provides a "doughnut" shaped beam in which there is substantially no energy in the central section In the design of FIG. 7 there are primary and secondary reflections: the primary reflection being at the inner interfaces 71 and then secondary reflections of the primary reflections at the outer interfaces 72. For example, a ray 75 from the first light source 20a is partially reflected at an inner interface as shown at 76. The reflected beam is then partially reflected again at 77 at an outer interface. The beam reflected at 77 then propagates, parallel with the central axis, to another outer interface where, at 78, the ray is again partially reflected out of the ejector 70. Thus, for the internal ray bundle 73 a small fraction of the internal reflected bundles will have secondary reflections when passing through the interface layers of the outer conical sections. In this case there will be a small fraction of the primary reflected light along the axis of the primary ray bundle. This will of course be reflected again at the next and successive interface layers. This is not deleterious for achieving a uniform light-source, as all reflections are either along the axis or in a plane perpendicular to the axis.

The above approach assumes that the incident ray bundles 73 from the first light source 20a are circular in profile. The external bundle 74 from the second light source 20b will require a hole in the center without light rays. This can be achieved through the use of annular injecting lens designs. A number of annular optical injector designs suitable for this purpose are presented in detail later in this document.

Figure 8:
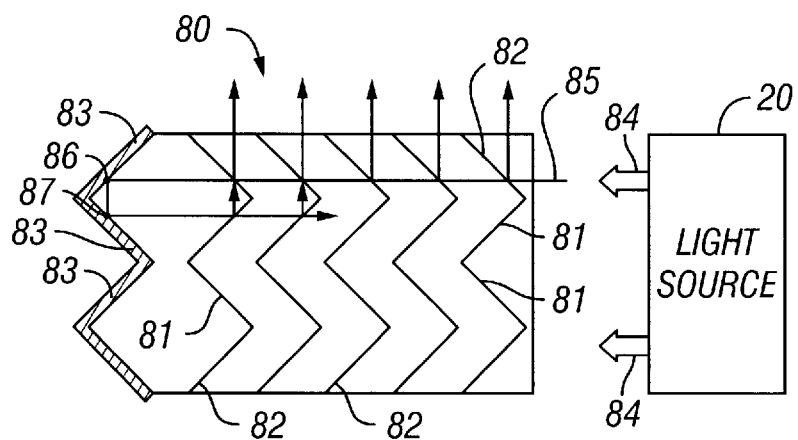
FIG. 8 is a cross-sectional view of a zigzag ejector with a turning reflector.

FIG. 8 illustrates an alternative approach to having two light sources on either side of the 360° cylindrical emitter described above employing a light injector on one end and a 180° turning optical reflector on the other end. The approach of FIG. 8 eliminates the need for the two sources of light shown in FIG. 7.

Reference is now made to FIG. 8, which is a cross-sectional view of a zigzag ejector 80 that includes a group of inner interfaces 81, a group of outer interfaces 82, and an optical turning reflector 83. The light injector 20 injects substantially collimated light 84 with an annular shape into the outer conical ring defined by the outer interfaces 82. At the opposite end of the ejector 80 the reflector 83 redirects any light that has not been reflected by the outer interfaces light back into the inner ring by reversing its direction (turning it 180°) and directing it along the inner interfaces 81. For example a ray 85 is injected along the outer interfaces 82 and is partially reflected at each subsequent interface 85. When the remaining light reaches the reflector 83, it is reflected 90° (i.e. downward) at 86 and then is again reflected 90° (i.e. horizontally parallel with the central axis) along the inner interfaces 81. As it traverses the inner interfaces, it again is partially reflected at each of the inner interfaces, most of which exits the ejector, although some is again partially reflected at an outer interface. A variety of reflector designs could accomplish turning, one practical design solution is illustrated in FIG. 8 by reflectively coating the existing geometry of the dual-conical geometry described above for the two-sided source.

The advantage of the zigzag ejector approach such as shown in FIGS. 7 and 8 is that approximately uniform 360° cylindrical output can be achieved without the need to gradually adjust the index of refraction of the thin secondary layers. The reason for this is that the ejection of light in the central conic sections is highest at the point furthest away from the source. Using the proper choice of materials and geometry, this approach can produce near uniform output. The criteria for achieving this is to choose the number of layers so that approximately 50% of the light flux from the source is ejected by the time the ray bundle reaches the end reflector.

Reflectances of Layers

It is apparent from calculations that, in the embodiments shown in FIGS. 7 and 8, the inner partially reflecting layers should have a higher reflectance coefficient than the outer. This can be accomplished by using a material of a different index of refraction for the inner secondary adhesive layer or increasing the number of interfaces for the inner face. Depending on the efficiency of the inner versus outer ejection efficiency this 50% design criteria can be adjusted either up or down. As the light flux ejected on the inner core will be greater nearer the end reflector, the sum of the two components can be designed to be roughly constant. Consider the case of the first reflection interface for the outer ring interfaces. Assume that the reflection is approximately 1% at the interface. If the flux is 100 lumens, there will be 1 lumen radiating from the outer cylinder at this interface. Assume that the flux is reduced to 50% of the original flux by the time it reaches the end reflector. In this case there will be two reflections of 1% each but the available flux will be reduced by approximately 50%. Thus the total amount will be 0.5 lumens from the outer conical surface reflection and 0.5 from the inner conical surface. However, by the time the inner ray bundle reaches the starting point it will be negligible. (Assuming that the inner surfaces has a higher coefficient of reflectance coefficient than the outer components or there are more layers.) Thus the total flux for both positions will be close to 1 lumen. There will be practical limitations as to how uniform a cylindrical source can be produced. However, it is anticipated that the approach can be made to meet industry standards of uniformity for most applications. A few examples illustrate some of the various approaches that are possible.

As an example, a four-interface design of the present invention is disclosed. For each single interface there are two partial reflections, as each side of the secondary material will reflect light. Let us also assume that the lens is designed to have a combined reflectance of 0.25 at each "double" interface. Let us also assume that the starting flux is 1 lumen. Table 1 shows that approximately 90% of the light is ejected. In this example, 10% would be lost or would be ejected at the first interface on the return.

TABLE 1

| Interface | reflectance | Flux starting 1 | Flux emitted | Combined |
|---|---|---|---|---|
| Outer | | | | |
| 1 | 0.25 | 1 | 0.25 | |
| 2 | 0.25 | 0.75 | 0.1875 | |
| 3 | 0.25 | 0.5625 | 0.140625 | |
| 4 | 0.25 | 0.421875 | 0.105469 | |
| Outer Total: | | | 0.683594 | |
| Inner | | | | |
| 4 | 0.25 | 0.316406 | 0.079102 | 0.18457 |
| 3 | 0.25 | 0.237305 | 0.059326 | 0.199951 |
| 2 | 0.25 | 0.177979 | 0.044495 | 0.231995 |
| 1 | 0.25 | 0.133484 | 0.033371 | 0.283371 |
| Inner Total: | | | 0.216293 | |
| Combined Total: | | | | 0.899887 |

Assuming that the 10% loss is absorbed and not ejected, the uniformity of this design is approximately 1.5, which is acceptable for many applications. A better uniformity is achieved if the reflectance for the inner layer is doubled. This can be achieved in a number of ways, for example by changing the index of refraction of the inner secondary layers, doubling the number of inner interfaces, or if metallic partial reflectors are used, increasing the thickness of the partially reflective coatings. Table 2 lists the results of such a system:

TABLE 2

| Interface | Reflectance | Flux starting 1 | Flux emitted | Combined |
|---|---|---|---|---|
| Outer | | | | |
| 1 | 0.25 | 1 | 0.25 | |
| 2 | 0.25 | 0.75 | 0.1875 | |
| 3 | 0.25 | 0.5625 | 0.140625 | |
| 4 | 0.25 | 0.421875 | 0.105469 | |
| Total Outer: | | | 0.683594 | |

TABLE 2-continued

| Interface | Reflectance | Flux starting 1 | Flux emitted | Combined |
|---|---|---|---|---|
| Inner | | | | |
| 4 | 0.5 | 0.316406 | 0.158203 | 0.263672 |
| 3 | 0.5 | 0.158203 | 0.079102 | 0.219727 |
| 2 | 0.5 | 0.079102 | 0.039551 | 0.227051 |
| 1 | 0.5 | 0.039551 | 0.019775 | 0.269775 |
| Total Inner: | | | 0.296631 | |
| Total Combined: | | | | 0.980225 |

In this system of Table 2, 98% of the flux is ejected by the time it returns to the starting face. The uniformity is approximately 1.2, an excellent figure for virtually all applications. Of course this somewhat complicates the design, as in the case of the Fresnel reflector approach, the index of refraction of the material will change or in another approach the outer and inner conical-based solids would have to be made independently as there would be twice as many inner surfaces as there are outer ones, or if the metallic layer approach is used then the thickness of the metallic layer would be increased to increase the partial reflectivity.

A third example, illustrated in Table 3, is of an optimized system where the index of refraction is slowly varying. Although the overall percentage ejected is 96%, the uniformity is superb. Other solutions are possible which eject an even higher percentage than the example illustrated in Table 3.

TABLE 3

| Interface | reflectance | Flux starting 1 | Flux emitted | Combined |
|---|---|---|---|---|
| outer | | | | |
| 1 | 0.2 | 1 | 0.2 | |
| 2 | 0.25 | 0.8 | 0.2 | |
| 3 | 0.34 | 0.6 | 0.204 | |
| 4 | 0.5 | 0.396 | 0.198 | |
| Total Outer: | | | 0.802 | |
| Inner | | | | |
| 4 | 0.2 | 0.198 | 0.0396 | 0.2376 |
| 3 | 0.25 | 0.1584 | 0.0396 | 0.2436 |
| 2 | 0.34 | 0.1188 | 0.040392 | 0.240392 |
| 1 | 0.5 | 0.078408 | 0.039204 | 0.239204 |
| Total Inner: | | | 0.158796 | |
| Total Combined: | | | | 0.960796 |

It may be noted that the above calculations do not address the interaction of the rays ejected from the inner core and the consequent reflections off of the outer conical surfaces. Based upon ray tracing studies, it is believed that for preliminary design calculations this effect can be neglected.

Optical Designs for Multiple Reflections

Figure 9:
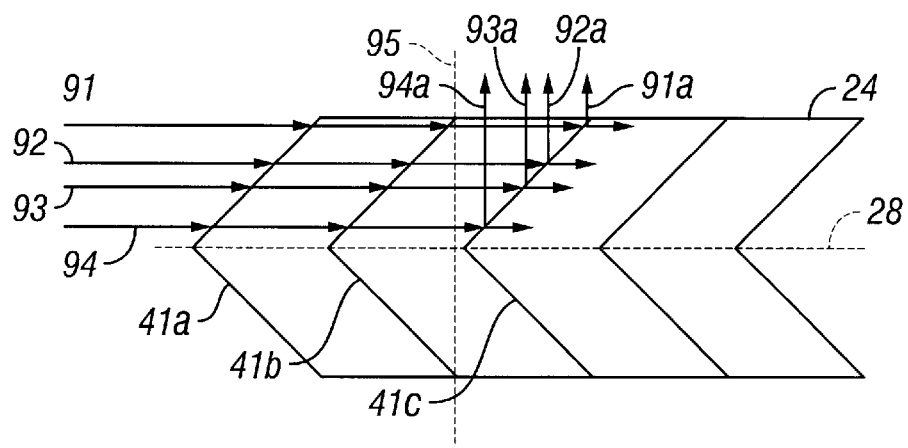
FIG. 9 is a cross-sectional diagram of an ejector that is formed in fully flashed geometric configuration.
Figure 10:
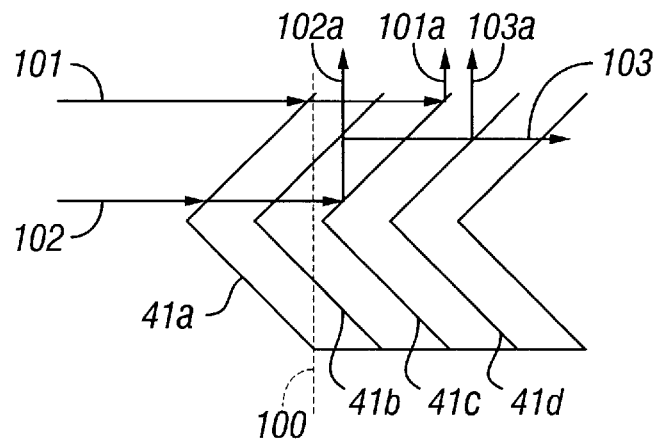
FIG. 10 is a cross-section diagram of an ejector that is formed with overlapping conical geometry.

Reference is now made to FIGS. 9 and 10 to show two different variations of 90° conical ejectors. FIG. 9 is a cross-sectional diagram of an ejector that is formed in fully flashed geometric configuration, and FIG. 10 is a cross-section diagram of an ejector that is formed with overlapping conical geometry.

In FIG. 9, a ray bundle striking the male part of the conical Fresnel reflector never strikes the female or male part of an adjacent conical surface, as can be seen by reference to the vertical line 95 drawn through the outer edges of a cone and perpendicular to the central axis 28. Thus, this design can be used with a ray bundle that strikes the entire surface of the cone without creating secondary longitudinal rays. As can be seen in FIG. 9, at every surface a uniform reflected ray bundle would completely flash the outer cylinder. For example, when first, second, third and fourth rays 91, 92, 93, and 94 partially reflect from the third interface 41c, each reflected ray 91a, 92a, 93a, and 94a exits the ejector 24 without interacting with the adjacent interface 41b. However, if the annular ray bundle has a hole in it then the outer surface will only be partially flashed.

In FIG. 10, the interfaces 41 overlap to some extent; for example a vertical line 100 drawn through the tips of the cone that defines the first interface 41a, shows that the first interface overlaps with, and blocks some of the reflected rays from the second interface 41b, particularly those reflections to the left of the vertical line 100. Thus the configuration shown in FIG. 10 is quite different from the one shown in FIG. 9 as some of the partially reflected rays will strike either the outer cylinder or strike a "female" surface of an adjacent cone. For example a first ray 101 is partially reflected at the third interface 41c to provide an exit ray 101a that does not interact with the adjacent interface 41b. However, a second ray 102, near the central axis 28, is partially reflected from the third interface 41c and then its exit ray 102a interacts with the second interface 41b, which partially reflects to generate a longitudinally traveling ray 103 that partially reflects from the fourth interface 41d to provide an exit beam 103a.

In the example illustrated by FIG. 10 those rays that strike to the left of a vertical line through the outer ends of the cones that define each interface are multi-reflected longitudinally along the axis of the device. These rays will be eventually reflected by the remaining surfaces in the configuration but the calculations are more complex than for the configuration of FIG. 9. However, there is an advantage to the approach of FIG. 10 as it can be designed to completely flash the outer cylinder without secondary longitudinal reflections for annular ray bundles with holes in them. For example if the annular ray bundle has a hole in it such that all the light rays struck the male surfaces to the right of the dotted line, then the cylinder wall will be completely flashed and there will be no secondary longitudinal rays produced.

Figure 11:
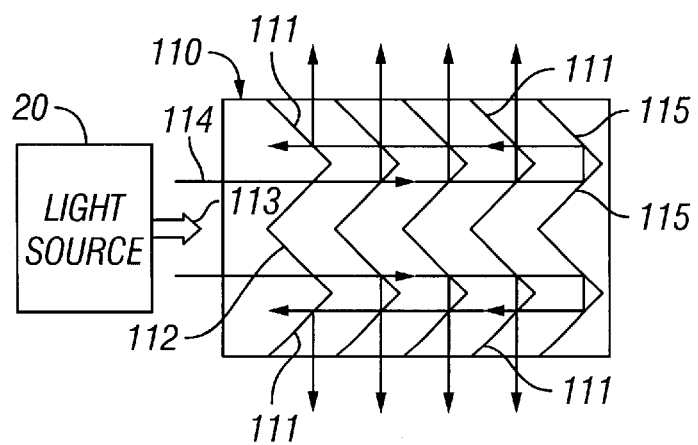
FIG. 11 is a cross-sectional view of an embodiment of the zigzag reflector that utilizes two oppositely positioned light sources.

Reference is now made to FIG. 11 to illustrate an embodiment of the zigzag ejector (other embodiments are discussed with reference to FIGS. 7 and 8) in which the light from the light source 20 first enters in a central ring and then returns on an outer ring via a turning reflector 115. FIG. 11 is a cross-sectional view of a zigzag ejector 110 that includes a group of inner interfaces 112 and a group of outer interfaces 111 oppositely facing from the inner interfaces 112. A light source 20 is arranged to provide a substantially collimated beam 113 to the inner interfaces 112. In FIG. 11, as in FIG. 7 there are primary and secondary reflections: the primary reflection being at the inner interfaces 112 and then secondary reflections of the primary reflections at the outer interfaces 111. For example, a first ray 114 from the light source is partially reflected at an inner interface as shown, and the reflected beam is then partially reflected again at an outer interface 111. However, the non-reflected portion of the first ray continues traveling longitudinally along the ejector until it is reflected from the reflector 115. Particularly, the first ray is reflected twice at approximately 90° to provide a total reflectance of about 180°, which returns the first ray in the opposite direction. In addition the reflector 115 shifts the ray upward so that it now interacts with the outer interfaces 111 as it returns. The returning ray is then partially reflected at each subsequent outer interface that it encounters.

Behavior of Rays Intersecting the Thin Interface

Figure 12:
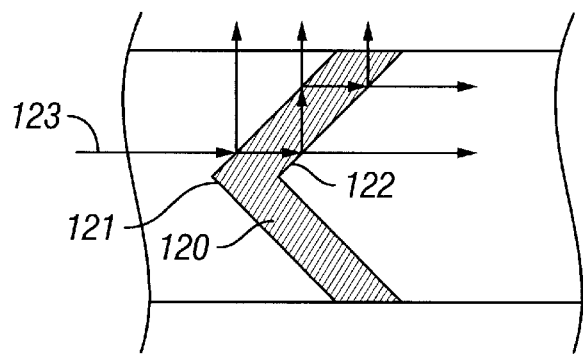
FIG. 12 is a magnified sectional view of a layer 120 that comprises a material that has an index of refraction different than the adjacent sections.

Reference is now made to FIG. 12 to illustrate the behavior of Fresnel reflections from multiple thin interfaces. FIG. 12 is a magnified sectional view of a layer 120 that comprises a material that has an index of refraction different than the adjacent sections. At a first junction 121 the layer 120 is adjacent to a first section, and at a second junction 122 the layer 120 is adjacent to a second section. When a ray strikes the layer 120 as was mentioned earlier there will be two Fresnel reflections, one on either side of the layer 120, at the first and second junctions respectively. An exemplary ray 123 encountering the first junction 121 will be ejected directly. At the second junction 122, a second reflection first travels through the layer before being partially reflected from the back side of the first junction 121 although a portion will continue and be ejected from the side. The second reflected ray then again travels through the first layer 120, and then most of the energy of the ray will pass through the second junction 122 side and be ejected from the layer 120, but a fraction of the energy of the ray will then be reflected at the second junction 122 back into the layer. However, because of the geometry a portion that is not ejected will eventually be reflected back onto the second surface. Again a fraction of the flux is reflected normal to the device axis while the remainder is sent longitudinally down the axis of the device. The normal reflected component again splits into two rays, one that is ejected, and the other that is sent longitudinally down the axis of the device. Eventually the ray splits and can propagate all the way to the outer cylinder face. FIG. 12 illustrates the phenomenon.

Divergence/Convergence of Ray Bundles

Although up to this point divergence and convergence of the longitudinal rays at the thin surfaces has been ignored in the analysis. For most applications the deviation of longitudinal rays (as calculated by Snell's law) is miniscule if the secondary "adhesive" layer is very thin. However, in some instances this must be considered in the design.

Application Where Non-Uniformity Is Desired

In some instances substantially radially oriented, non-collimated light is needed from an ejector. This can be accomplished by providing partially collimated light to the ejector. Further, the outer surface of the cylindrical or other shaped ejector can have scattering or prismatic structures added to it to redirect the light in the desired output distribution pattern. Also, the shape of the radially ejected light can be further adjusted by shaping the partially reflective interface layers other than linear. Various shaped curves can be employed to spread the light.

Polarization Issues and Solutions

Reference is now made to FIGS. 13A, 13B, 14, 15A, 15B, and 15C. When light passes through a large number of parallel plates of dielectric material, the light transmitted (not ejected) becomes partially linearly polarized in the longitudinal direction. Strictly speaking, the light will become linearly polarized only if the media is made of a dielectric material (i.e. nonconducting). If the material is metallic, the polarization state of the initial light source would not be affected. The reason for this is that the Fresnel reflections are higher for the transverse polarized component of light for most incidence angles. This is especially true at incidence angles close to 45°. If the transmitted light is highly polarized in the longitudinal direction then the fraction of light which will be Fresnel reflected at the interfaces will be smaller as the transmitted light makes its way from one interface to the next. After many layers the ejected light will thus be reduced significantly. A solution to this problem is to make a second pass in the opposite direction in the Fresnel ejector after the rays are rotated 90° in polarization.

FIGS. 13A, 13B, 14, 15A, 15B, and 15C show several devices in which the linearly polarized rays traveling in the longitudinal direction are modified in polarization and reversed in direction at the end of a Fresnel ejector so that they will eject while traveling in the reverse direction.

Figure 13A:
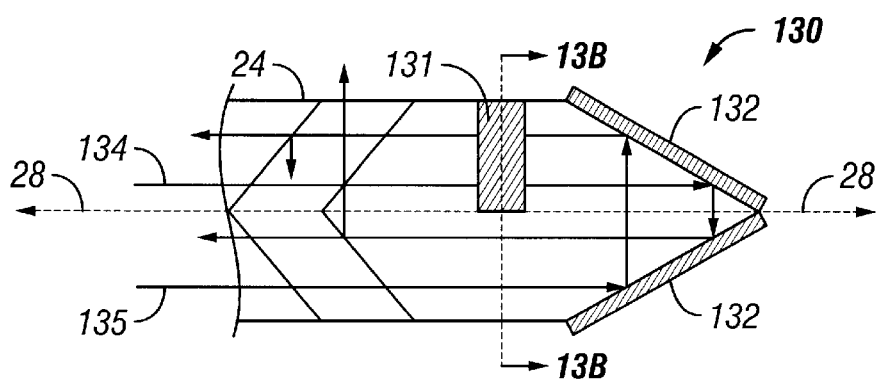
FIG. 13A is a cross-sectional view of an end section that can be utilized at the end of a cylindrical ejector.
Figure 13B:
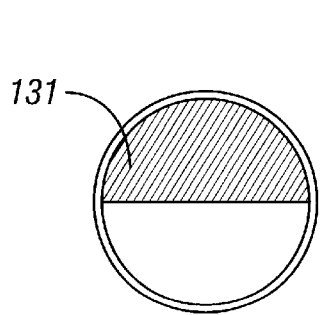
FIG. 13B is a front view of an end section that can be utilized at the end of a cylindrical ejector.

FIG. 13A is a cross-sectional view, and FIG. 13B is a front view of an end section 130 that can be utilized at the end of a cylindrical ejector 24 (FIG. 2) to rotate the polarization by 90° and reverse the direction of a longitudinally-traveling ray. Within the end section 130, a half disk-shaped circular retarder 131 (also called a polarization rotator) is situated to occupy a semicircle of the base cross-section of the ejector 24 (see FIG. 13B). At the far end of the end section, a conically shaped reflector 132 is arranged to reverse the direction of the rays. The circular retarder is configured for changing the state of polarization of the end rays emanating from the conical Fresnel ejector by about 90°, which occurs for any linear polarized light ray impinging approximately normal to the retarder 131.

Due to the circular symmetry of the configuration of FIG. 13, all the rays are reflected back and cross the retarder 131 only once, some of them before being reflected backwards and some others after being reflected by the cone. For example, a first ray 134 propagating in the upper half of the ejector first travels through the circular retarder 131 which changes its polarization by 90°, and then is reflected in direction and shifted in position by the end reflector 132 so that it propagates in the reverse direction along the lower half of the ejector. A second ray 135 propagating in the lower half of the ejector is first reflected by the end reflector 132 and shifted in position so that it propagates in the reverse direction through the circular retarder 131 where its polarization is rotated before propagating through the upper half of the ejector.

A suitable retarder 131 is chosen such that it produces 90° turn. For example, a liquid crystal structure of the "twist" type will act as the primary retarder without the need for electrodes or the use of electrically based polarization-turning devices. In order to improve the performance of the liquid crystal circular retarder, a linear retarder compensating sheet can be added to the liquid crystal structure. This approach is practical for collimated or nearly collimated rays.

There are other classes of materials that could be used for the circular retarder. These classes of materials all have the physical property called optical activity, which allows it to be used as a polarization rotator. The optical activity of a specific material can be quantified by its specific rotatory power. For example, crystalline quartz has a value for this property for sodium light of 21.7°/mm. In this case, a plate, which is one millimeter thick, will rotate the light source about 21.70°.

Figure 14:
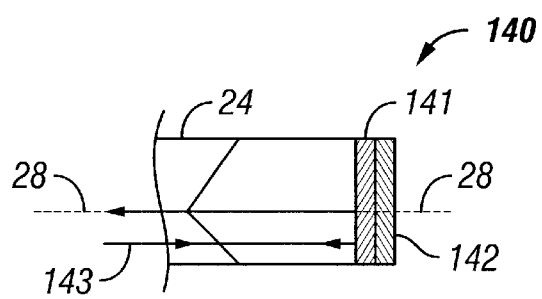
FIG. 14 is a cross-sectional view of an end section that comprises a disk shaped retarder.

FIG. 14 shows an alternative approach to changing polarization and reversing direction of linearly polarized light traveling longitudinally in an ejector 24. FIG. 14 is a cross-sectional view of an end section 140 for an ejector that comprises a disk shaped Faraday retarder 141 (i.e. from a group of retarders known as Faraday retarders which are based on an application of the Faraday Effect) that can turn the state of rotation by 90°. A flat mirror 142 is situated to reverse the direction of the beam. For example, a longitudinally traveling linearly polarized ray 143 is reversed in direction by the flat mirror 142 and rotated in polarization by the Faraday rotator 141.

The Faraday retarder approach shown in FIG. 14 utilizes the magneto-optical properties of certain materials. These retarders act as circular retarders except that they turn the state of polarization clockwise or anti-clockwise depending on the orientation of the magnetic field. They can achieve a 90° turn for the returning wave (or other degrees of turn depending on the design and settings). They are often used in optical isolators for this purpose.

Devices based on the Kerr and Pockels Effect may also be exploited for this purpose such as shown in FIG. 14. Such devices are similar in their function and use to the Faraday effect retarder mentioned above. Pockels and Kerr effect devices have an advantage over the Faraday devices in terms of their lesser power requirements. Another advantage of the electro/magnetic devices versus the other retarding devices is that they can be used to modify the degree of retardation in a very short period of time ($10^{-9}$ second is possible). This could be useful in a number of applications such as high-speed optical communications. In this application a Pockels device (or other similar device) can be used to change the degree of retardation. This would result in a change of amplitude and state of polarization of the output from the ejector.

Figure 15A:
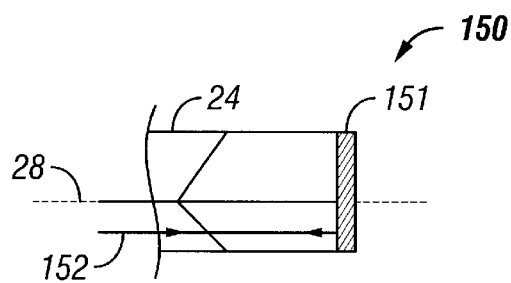
FIG. 15A is a cross-sectional view of an end section that comprises a disk shaped spiral retarder/reflector.
Figure 15B:
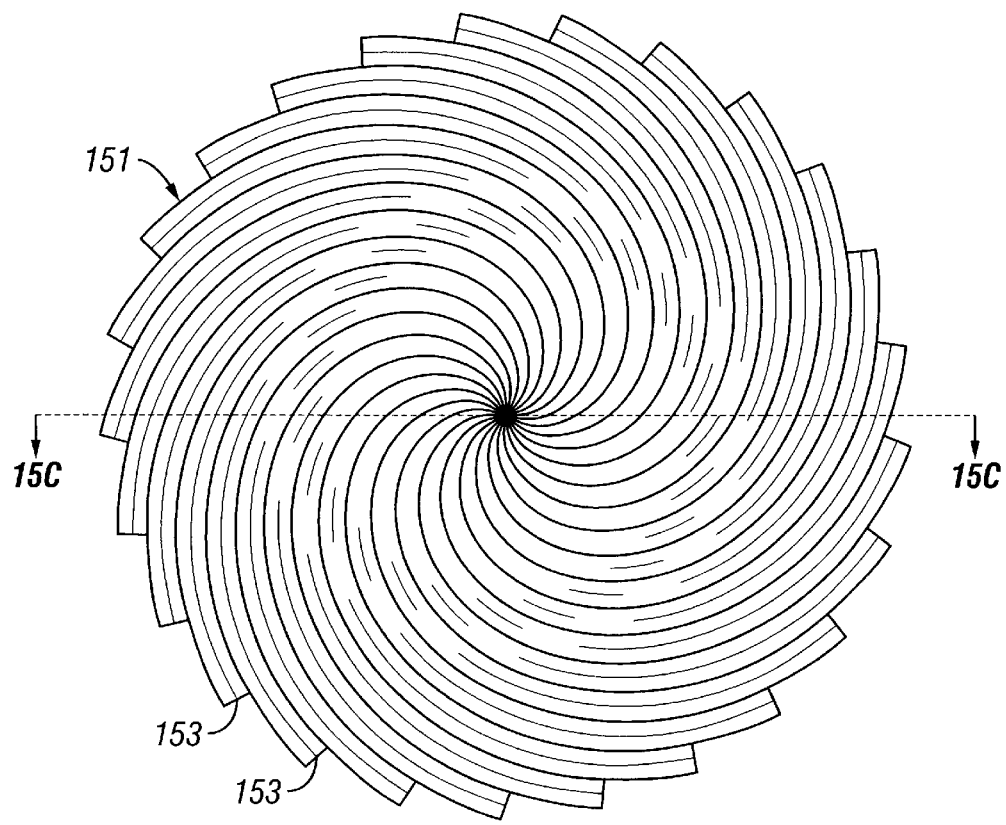
FIG. 15B is a top plan view of the spiral retarder/reflector shown in FIG. 15A.
Figure 15C:
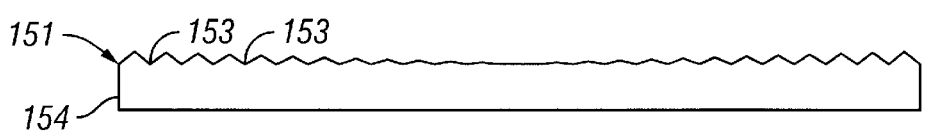
FIG. 15C is a cross-sectional view of the spiral retarder/reflector shown in FIG. 15B.

Reference is now made to FIGS. 15A, 15B, and 15C (collectively FIG. 15). FIG. 15A shows another alternative approach to changing polarization and reversing direction of linearly polarized light traveling longitudinally in an ejector 24. FIG. 15A is a cross-sectional view of an end section 150 that comprises a disk shaped spiral retarder/reflector 151. For example, a longitudinally traveling linearly polarized ray 152 is reversed in direction and rotated in polarization by the spiral retarder/reflector 151. FIG. 15B is a top plan view of the spiral retarder/reflector 151, and FIG. 15B is a cross-sectional view. The spiral retarder/reflector 151 is a novel geometrical solution to the problem of rotation of the state of polarization by 90°. The spiral retarder/reflector comprises a group of 90°-cut grooves 153, cut such that the grooves always form an angle of 45° with the radial vector; i.e. the curve along the groove is approximately a logarithmic spiral. The grooves may be small compared with the size of the circle defined by the perimeter of the disk shape of the retarder/reflector. In order to provide reflectance, the grooves are formed on a metallic surface; for example the grooves 153 may be formed on a substrate 154 comprising a metallic material.

In the embodiments described with reference to FIGS. 13, 14, and 15, there is a clear advantage to having the light turned 90° in polarization because the transverse polarized light which now is returned is highly reflective at the conical interfaces. This will increase the light ejected at the far end of the device (away from the source). This can be used to good effect to achieve better uniformity. Also, given the correct design, highly transverse polarized light can be ejected by the cylindrical (or other shapes) ejector. This can be useful for many applications. In particular, this is useful when the design calls for the ejected the light to be used with a conical reflector such as discussed with reference to FIG. 26.

There are alternative embodiments of the above approach for the location and shape of the polarizing "circular"

retarder that can be employed for a wide number of designs. For example, in the design shown in FIG. 13 the retarder can be an annular ring shape (if the polarization turn is done on the rays that strike the polarizer first and the conical reflector next). A second solution is to make it a circular shape (the diameter of the inner cones) in the end center of the device (after the rays are turned by the reflector and are coming back into the ejector.) There are a wide variety of retarder shapes and positions that can be applied to the variety of designs presented in this document and their obvious extensions. The design principles for the "circular" retarder approach fall into one of two categories:

For any type of ejector, where the second pass is through the same surface ejectors (but in the opposite direction), there is a circular or N-sided solution. The shape of the retarder is one half of the cross-sectional shape along a diagonal of the section through the ejector. This holds true for any n-sided polygon where the sides are even. (It does not work perfectly well for the odd-sided cases.) For example, if the shape of the ejector is a regular hexagon, the shape of the retarder is one half the hexagon—where the axis of the shape is drawn through an opposite set of vertices.

If the return reflections are striking a "new" set of surfaces or an area on the surfaces, then the retarder can be of similar shape to the cross-sectional shape to the ejector. In one approach the retarder is the cross-sectional shape of the ray bundle coming from the source into the ejector. The other approach is to make the shape the same as the cross-sectional shape of the ray bundle returning in the direction of the source.

There are a variety of design possibilities that can be based on an application of the other polarization solutions presented and exemplified in FIGS. 13, 14 and 15.

Block Ejector

Reference is now made to FIGS. 16A, 16B, 17A, 17B, 18, and 19 to illustrate a pyramidal-shaped block ejector.

Figure 18:
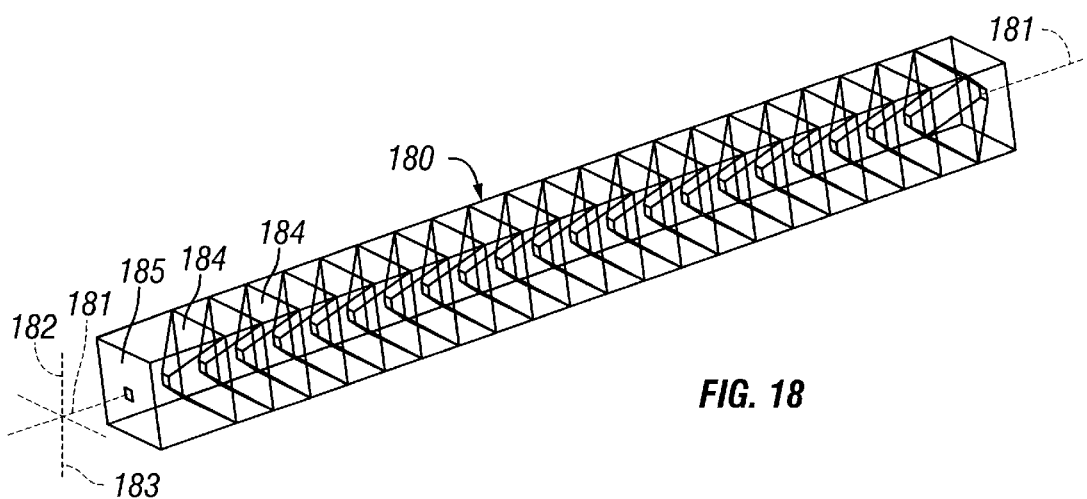
FIG. 18 is a perspective view of a block 180 that comprises a plurality of pyramidal-shaped interfaces.

FIG. 18 is a perspective view of a block ejector 180 that comprises a plurality of pyramidal shaped interfaces 184 that are partially reflective by suitable means such as Fresnel reflectance or metallic or dielectric coatings. For references purposes, the block ejector 180 defines a central axis 181, a vertical axis 182, and a horizontal axis 183. As with the cylindrical ejector 24 (FIG. 2) the series of partially reflective interfaces 184 eject light via partial reflectance as light traverses longitudinally (i.e. along the central axis 181) through the ejector 180. In one embodiment the interfaces 184 are provided by junctions with double-pyramid shaped components 161, stacked together.

FIG. 16A is a perspective view, and FIG. 16B is a cross-sectional view of a primary component 160 for the pyramidal block ejector 180. Like the cones 31 (FIG. 3) the primary component 160 comprises a male pyramid cone 161 on one side and a female pyramid cone 162 on the opposite side. The male and female sides are shaped to be complementary when situated adjacent to each other, to provide the interfaces 184 shown in FIG. 18. In FIG. 16A, the primary component is a square pyramid shape with an approximately constant thickness, with the angle of the pyramid being about 45° with respect to the axis of symmetry 181.

FIG. 17A is a perspective view, and FIG. 17B is a cross-sectional view of an end component 170 for the pyramidal block ejector 180. The end component 170 comprises a female pyramid cone 171 on the one side and a flat entrance surface 172 on the other side. The female cone 171 is shaped to be complementary with a male pyramid cone 161 of the primary component, to provide the first interface 184 shown in FIG. 18. In FIG. 17A, the angle of the pyramid is about 45° with respect to the axis of symmetry 181. The flat entrance 185 is provided to ensure that the collimated light strikes the first interface at the correct angle of incidence.

As described with reference to the cones of FIG. 3, partial reflectance can be provided by Fresnel reflection or a coating such as dielectric or metallic coating. To provide Fresnel reflectance, the pyramidal pieces can be bonded together using an adhesive material that has an index of refraction different than the material of the pyramids or by cutting them out of square bar stock and filling the voids with a suitable material.

Figure 19:
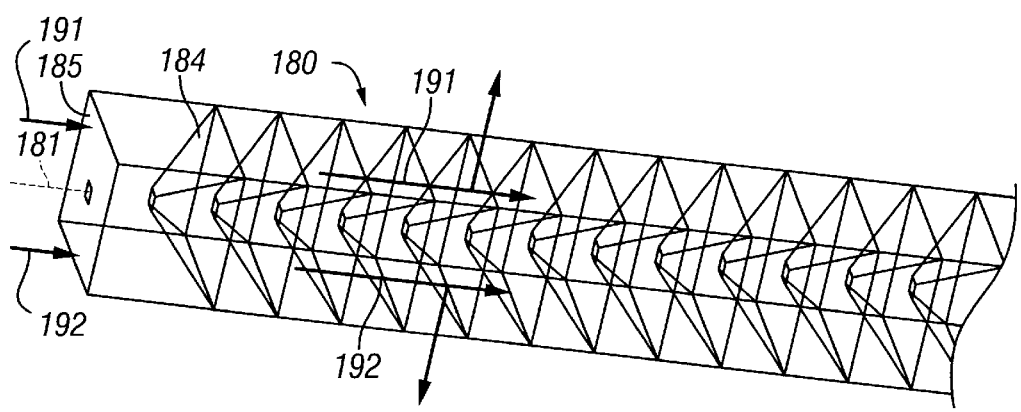
FIG. 19 illustrates light rays from a light source entering a block ejector through an entrance face.

FIG. 19 is a diagram that illustrates light rays 191 and 192 from a light source (not shown) entering the block ejector through the entrance face 185. The light rays 191 and 192 are partially reflected at each interface, and provide an output that is directional in the four directions corresponding to the sides of the block ejector. It may be noted that the light source can be collimated or partially collimated depending on the desired light output. One advantage of this embodiment is the ejection of four uniform beams of approximately collimated light normal to the four planes of the elongated box defined by the block ejector.

End Section for Block Ejectors

As with the cylindrical ejectors, at the end of the ejector the remaining light is highly polarized. For some embodiments it may be useful to redirect the light into the ejector, change its polarization, and then eject it in the reverse direction, such as described with reference to FIGS. 13, 14, and 15. In the case of the pyramidal ejector with a square cross section, the 90° turn polarization circular-retarder must be oriented in a diagonal direction across the square, as shown in FIG. 20: This will allow the remaining ray, once it has passed through the last pyramid, to be reflected 180° and, whether it has first gone through the retarder or not, not to intersect it once more and thus return for a second pass through the ejector with the correct polarization.

Figure 20A:
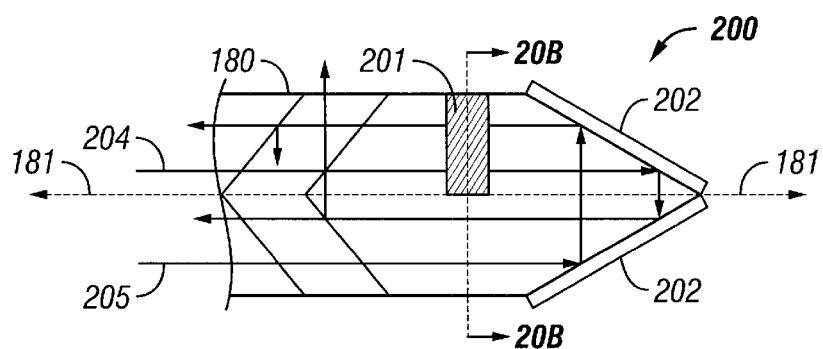
FIG. 20A is a cross-sectional view of an end section for a block ejector.
Figure 20B:
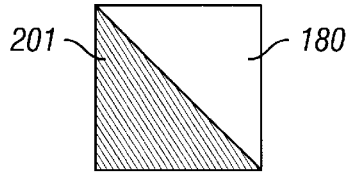
FIG. 20B is a front view of an end section for a block ejector.

Reference is now made to FIGS. 20A and 20B. FIG. 20A is a cross-sectional view, and FIG. 20B is a front view of an end section 200 that can be utilized at the end of a block ejector 180 (FIG. 18) to rotate the polarization by 90° and reverse the direction of a longitudinally-traveling ray. Within the end section 200, a half right angle triangular-shaped circular retarder 201 (also called a polarization rotator) is situated to occupy a diagonally half-square within the ejector 180 (see FIG. 20B). At the far end of the end section, a pyramidally-shaped reflector 202 is arranged to reverse the direction of the rays. The circular retarder 201 is configured for changing the state of polarization of the end rays emanating from the block ejector 180 by about 90°, which occurs for any linear polarized light ray impinging approximately normal to the retarder 201.

Due to the symmetry of the configuration of FIG. 20, all the rays are reflected back and cross the retarder 201 only once, some of them before being reflected backwards and some others after being reflected by the pyramidal cone. For example, a first ray 204 propagating in the upper half of the ejector first travels through the circular retarder 201 which changes its polarization by 90°, and then is reflected in direction and shifted in position by the end reflector 202 so that it propagates in the reverse direction along the lower half of the ejector. A second ray 205 propagating in the lower half of the ejector is first reflected by the end reflector 202 and shifted in position so that it propagates in the reverse direction through the circular retarder 201 where its polarization is rotated before propagating through the upper half of the ejector.

N-Sided Fresnel Ejector

The above approach can be used to design families of N-sided symmetrical and unsymmetrical oriented pyramidal ejectors of any number of sides. The following section illustrates the more general approach with an example of how a 45-45-90° triangular ejector can be designed.

The Triangular-Base Pyramidal Case

Figure 21:
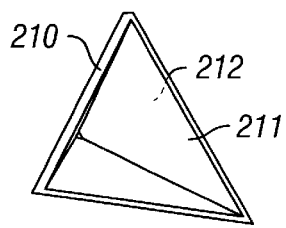
FIG. 21 is a perspective view of a primary component for a triangular ejector.
Figure 22:
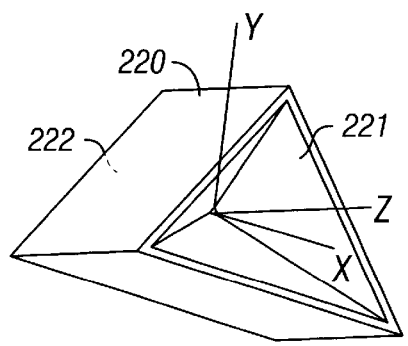
FIG. 22 is a perspective view of an end component for a triangular ejector.
Figure 23:
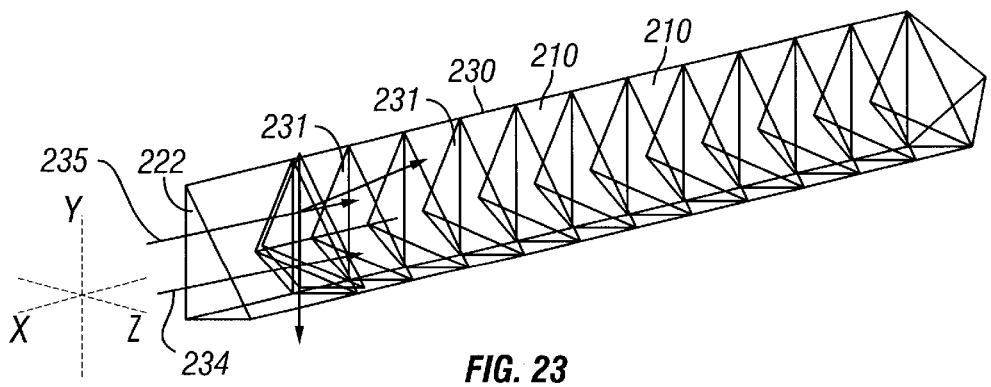
FIG. 23 is a diagram of an triangular block ejector showing a plurality of assembled primary components.

Reference is now made to FIGS. 21, 22, and 23 to illustrate a triangular-based pyramidal ejector that is similar to the square-based pyramidal block ejector 180, except that it has a triangular profile instead of square.

FIG. 23 is a diagram that shows a triangular block ejector 230 that comprises a plurality of partially reflective interfaces 231. In one embodiment the interfaces 231 are provided by junctions between primary components 210, shown in FIG. 21. Each primary component includes a female pyramid surface 211 and a male pyramid surface 212 that have a complementary shape that allows them to be "stacked". FIG. 21 is a perspective view of a 45-45-90° triangular-based pyramidal cone component 210, which can be used in a similar manner to the components used in the conical-cylinder and the square-pyramidal/elongated cases.

As described before, the arrangement and bonding of the various pieces can proceed in the same manner as in the case of the conical and square-pyramidal cases. FIG. 22 is a perspective view of a first piece 220 comprising a female pyramidal surface 221 and a planar surface 222 normal to the oncoming collimated light rays 234 and 235 shown in FIG. 23:

The arrangement of the various pieces to form an elongated triangular tube containing the triangular pyramidal pieces would also follow the fashion of the other two embodiments as shown previously with respect to FIGS. 4 and 18, for example.

Figure 24A:
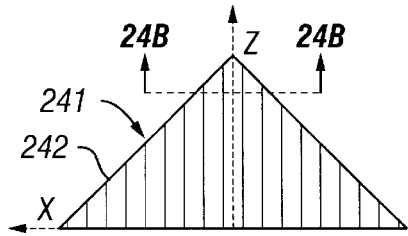
FIG. 24A is a top plan view of a V-groove return mirror.
Figure 24B:
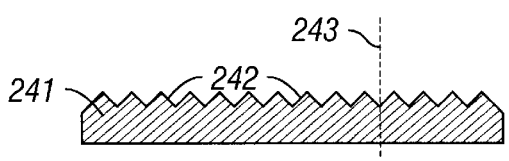
FIG. 24B is a cross-sectional view of the V-groove return mirror.
Figure 24C:
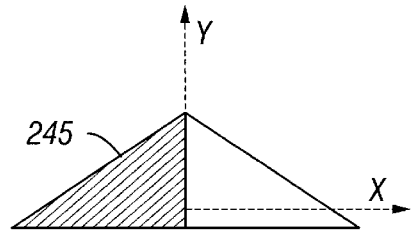
FIG. 24C is a top plan view of a circular rotator for a triangular ejector.

Reference is now made to FIGS. 24A, 24B, and 24C. Regarding polarization issues, in the case of odd-numbered N-sided polygon ejectors such as the triangular pyramidal case, Faraday and V-groove retarders may still be used but the circular retarders based on the optical activity of a material may not always be used with 100% efficiency, due to the geometry of the non-symmetrical cross sections not permitting the light rays to pass through the retarder only once on their way to the end of the emitter and on their return after a 180° reflection. For some cases however, there are design solutions to this problem. Assuming the case of the 45-45-90° triangular configuration, and that the plane of symmetry of the triangular stack ejector is in the y-z plane, then a suitable design for the end piece (with the V-groove retarders and circular rotator sheet) to both reflect light and to rotate its state of polarization is shown in FIG. 24A, 24B, and 24C. The V-groove device acts as both a 90° retarder and a turning reflector. The circular retarder approach also requires a turning reflector.

FIG. 24A is top plan view, and FIG. 24B is cross-sectional view of a two-surface V-groove return mirror 241 situated in the x-z plane, such that its plane of symmetry is coincident with the plane of symmetry of the ejector. In this embodiment, the V-groove structure comprises a series of parallel grooves 242 aligned in the triangular structure of the ejector so the dominant plane of polarization of the incident light is at about 45° to the grooves. FIG. 24B is a cross-sectional view of the V-groove return mirror 241 that shows a series of V-grooves 242 in cross-section. The grooves 242 are approximately uniform in cross-section, and the sides of each groove make an approximately 45° angle with respect to a normal 243 (i.e. the total angle of each groove is about 90°).

FIG. 24C is a top plan view of a circular rotator 245 that is situated in the x-y plane and used for polarization rotation. For the case of the 45-45-90° triangular configuration, the circular rotator 245 is one-half of the cross-section of the ejector. A turning reflector is arranged behind the circular rotator and comprises two triangular reflectors with a 90° dihedral angle between the two surfaces. The edge formed by the intersection of the two surfaces of the turning reflector is perpendicular to the x-z plane and is parallel and equal in height to the edge of the triangular-shaped circular retarder. This edge is the one which is perpendicular to the x-z plane or parallel to the y-axis. The rays travel along the longitudinal axis of the ejector, at the end first striking either the triangular retarder at an approximately normal angle of incidence or striking the open face of the turning reflector at an approximate incidence angle of 45°. In the case where the incident ray first strikes the circular rotator, the polarization state is turned approximately 90°. The ray then strikes the reflector face behind the rotator device and is turned 90° so as to strike the other reflector face. This face turns the ray down the stack approximately parallel to the z-axis. In the case where the ray first strikes the open face of the turning reflector, the ray is turned 90° to the second face which in turn redirects the ray to the circular retarder at an angle of incidence approximately normal to the plane of the retarder. The ray's plane of polarization is then rotated approximately 90° by the retarder.

V-Groove Retarders—General Solution

Figure 25A:
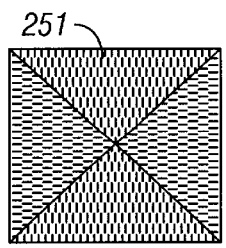
FIG. 25A is an end view of the end of a block ejector, showing the dominant polarization of light.
Figure 25B:
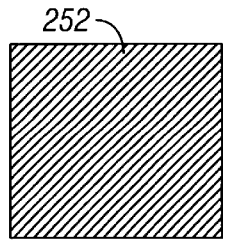
FIG. 25B is an end view of a grooved retarder at the end of a block ejector.

Reference is now made to FIG. 25A and 25B. In the case of N-sided polygon ejectors, the design of the spiral retarder discussed with reference to FIG. 15 is no longer valid. This is because the spiral retarder is a 90° rotator for polarizations that are either contained within the meridian plane of the axis of extrusion or normal to it. Therefore, the spiral geometry is only applicable to conical ejectors in which the polarization of light at the end of the ejector is primarily in the radial direction. There is, however a more general class of retarders that is based on a principle similar to the one employed in the design of the spiral groove retarder. An appropriate general name for these devices is V-groove retarders, which is a name that typifies the nature of the device, which can take a number of forms. For instance, FIG. 25B illustrates a groove retarder for the case of a square pyramidal ejector.

FIG. 25A is an end view illustrating the dominant polarization of the light at the end of the block ejector 180 (FIG. 18). FIG. 25B is an end view of a groove retarder situated at the end of the block ejector, comprising a parallel group of grooves 252 formed on a metallic layer so as to be reflective. As can be seen by comparing FIGS. 25A and 25B, the grooves 252 are formed at a 45° angle with both of the directions of the dominant polarization. As was the case with the spiral V-groove retarder described earlier with reference to FIG. 15, for example, the grooves have an inner angle of 90°. This case is particularly simple to manufacture; for example the grooved substrate can be molded of plastic in the desired configuration and then coated with a metallic material to provide suitable reflection. The direction of the grooves in a Groove Retarder is obtained by calculating the line integrals of the vector field, which forms 45° with the directions of dominant polarization. These line integrals are spirals when the dominant polarization is radial. The method of designing V-groove retarders can be applied to provide V-groove retarders for a variety of optical devices, in addition the ejectors described herein.

4) Cylindrical Ejector with a Larger Conical Reflector

Figure 26:
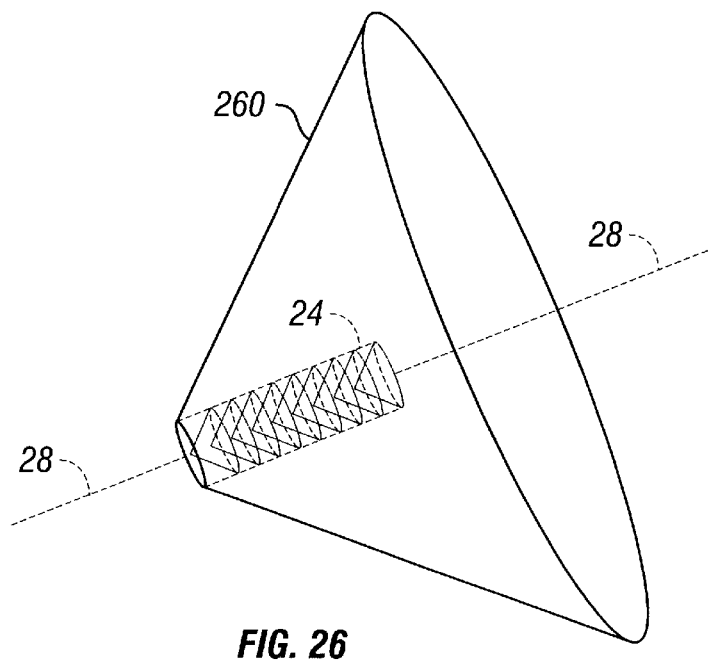
FIG. 26 is a perspective view of a cylindrical ejector within a conical outer reflector.
Figure 27:
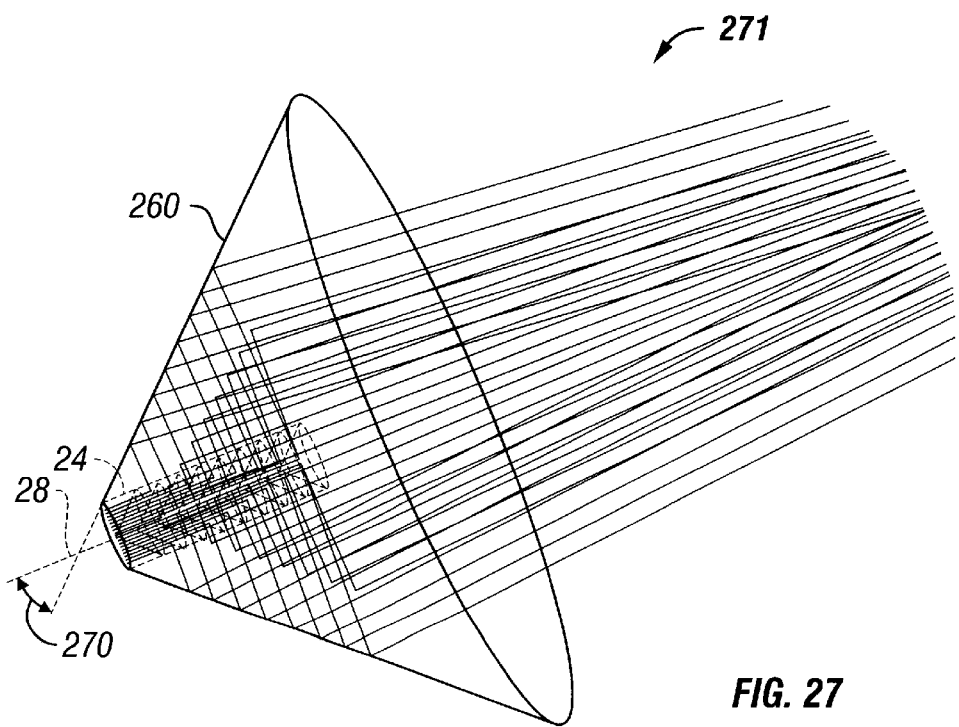
FIG. 27 is a side view of the cylindrical ejector situated within a conical reflector of FIG. 26.

Reference is now made to FIGS. 26 and 27 which illustrate a cylindrical ejector 24 situated within a conical reflector 260 so that the central axis 28 of the ejector is approximately aligned with a central axis defined by the conical reflector 260. FIG. 26 is a perspective view that shows the cylindrical ejector 24 arranged symmetrically within a conical reflector 260 that has a cylindrical shape larger than the cylinder of the ejector 24. The conical reflector can have a wide variety of shapes. Dependent upon the embodiment, the conical reflector may be designed to collimate, converge or diverge the 360° radially collimated light emitted from the cylindrical ejector 24. Furthermore, the conical reflector 260 may or may not have a uniform shape conical shape; e.g. it may be curved or shaped to provide a desired optical effect.

FIG. 27 is a cross section of the cylindrical ejector 24 situated within the conical reflector 260. The degree of divergence of the light from the reflector 260 is controlled by the reflector cone half angle 270, with respect to the central axis 28. For example, with a cone half angle of 45°, the reflector 260 would substantially collimate the laterally ejected and radially-collimated light from the linear ejector. If the half angle is large than 45° the reflected light would be substantially divergent while at half angles less than 45° the light can either converge or diverge. In the embodiment of FIG. 27, the group of rays emitted laterally from the ejector 24 are reflected from the reflector 260 in a converging manner as shown at 271, therefore the half angle 270 in the illustrated embodiment would be less than 45°.

5) Cylindrical Ejector in an N-sided Pyramidal Reflector

Figure 28:
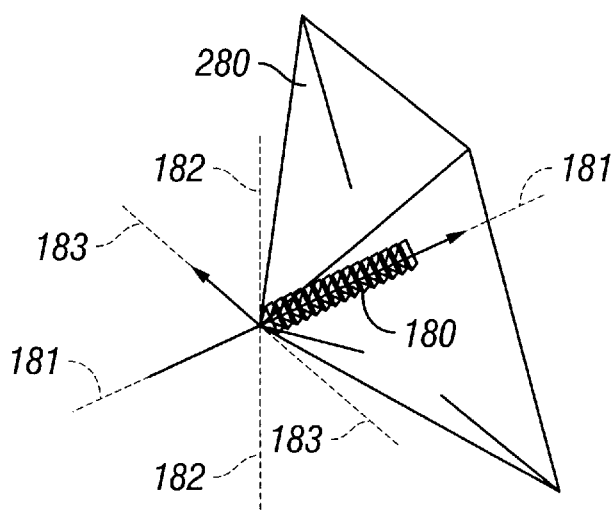
FIG. 28 is a side view of a block ejector situated within a pyramidal reflector.

In an alternative embodiment to that shown in FIGS. 26 and 27, a pyramidal reflector (such as shown in FIG. 28) replaces the conical reflector surrounding the cylindrical ejector 24. The pyramidal reflector can have any number of sides; i.e. it may be three, four or N-sided. In alternative embodiments the reflector light output characteristics could be modified by altering the slope and/or shape of the sides relative to the axis of the reflector. An off-axis reflector will yield asymmetric light profiles. This technique can be applied to any combination of optical systems that employ a central ejector.

6) Block Ejector in Pyramidal Reflector

Reference is now made to FIG. 28, which comprises the block ejector 180 (FIG. 18) centrally situated within a pyramidal reflector 280 to provide a pyramidal beam output profile. In the approach shown in FIG. 28, the individual male/female components of the block ejector 180 comprise a 4-sided pyramidal male/female shape such as shown with reference to FIGS. 17, 18, and 19, and may be put together in the same manner as the conical components in the conical ejector.

In FIG. 28, substantially collimated light is emitted laterally by the block ejector 180 in four directions only, at a 90° angle to each other. This collimated light is then reflected via a 4-sided pyramidal reflector. Particularly, the block ejector 180 is arranged symmetrically so that its 4-sided lateral light output reflects from a respective one of the four sides of the pyramidal reflector 280, so that the light output of the optical system closely matches a square. Also, as with the conical reflector discussed with reference to FIGS. 26 and 27, the degree of divergence of the light from the reflector is controlled by the reflector cone half angle. With a cone half angle of 45° the reflector collimates the laterally ejected and collimated light from the Fresnel block ejector. If the half angle is larger than 45°, the reflected light is divergent while at half angles less than 45° the light can either converge or diverge.

7) N-Sided Polygonal Fresnel Ejector inside an N-Sided Polygonal Reflector.

In alternative embodiments, the block ejector 180 and the pyramidal reflector 280 may have any number of sides (i.e. each is N-sided). By matching various N-sided ejectors with N-sided reflectors, any polygonal-shaped output can be created. For example in an alternative embodiment, a five-fold symmetrical light source can be created by utilizing a five-sided block ejector with a five-sided pyramidal reflector.

8) Cylindrical Ejector in a Cylindrical Annular Area Emitter.

Figure 29A:
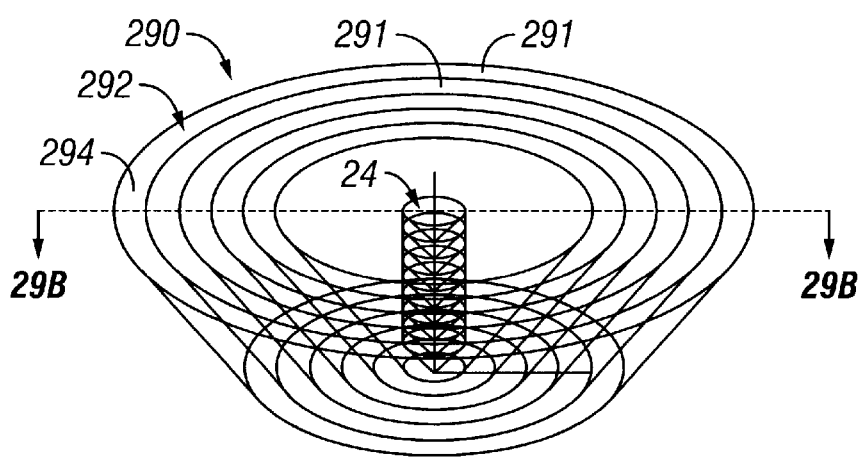
FIG. 29A is a perspective view of an annular area emitter.
Figure 29B:
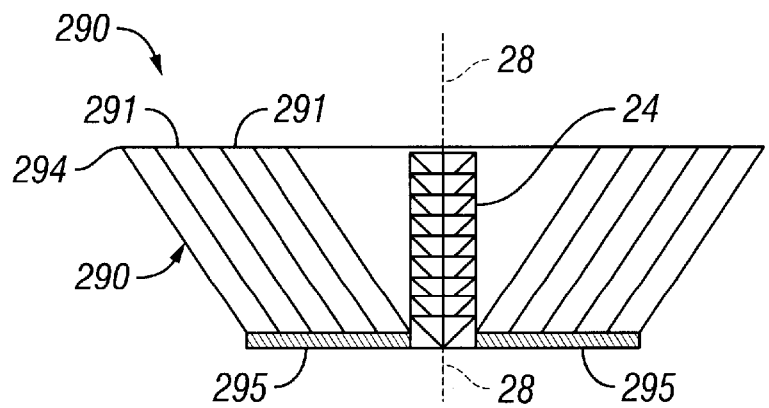
FIG. 29B is a cross-sectional view of an annular area emitter shown in FIG. 29A.

Reference is now made to FIGS. 29A and 29B (collectively FIG. 29) to illustrate an area emitter 290 including an conical outer reflector 292 that utilizes partial reflection. FIG. 29A is a perspective view of the annular area emitter 290, and FIG. 29B is a cross-section of the emitter. Particularly, the cylindrical ejector 24 is surrounded on its length by the conical reflector 290 that comprises a number of hollow conical concentric cones 291, each having a height at least equal to the length of the cylindrical ejector 24. In this approach a cylindrical ejector 24 is situated so that its central axis 28 approximately coincides with the central axis defined by the cones of the outer reflector 290. The annular, concentric cones 291 are smaller closest to the ejector 24, and moving outward, are increased in size to the desired diameter. In some embodiments the concentric cones are adhered together using a material that has a different index of refraction than itself to provide a cylindrical Fresnel ejector. In other embodiments a partially reflective metallic layer may be provided at the interfaces between the concentric cones. The outer conical surface of the outermost cone may be coated for total reflectance to reflect light back into the interfaces to be ejected. The "top" ejecting surface 294 of the concentric cones (as opposed to the cylindrical ejector which is said to eject from its sides) can be either horizontal or be individually adjusted to redirect the annular light source to any direction. Redirection at the top annular surfaces can occur by suitable mechanism such as refraction, diffraction, TIR, micro-prismatic structures, and so forth.

The distance between the concentric cones and the slope of the walls controls the output. Further, each cone at its exit surface 294 can be adjusted to redirect the light via a number of means. For example if the slope of the top surface 294 of the concentric cones is other than horizontal, the output will be refracted at the surface or be totally internally reflected. It should be clear that the output is annular in nature and can be adjusted for a wide range of distribution patterns. By adjusting the distances between the concentric cones and the bonding materials (which modify the index of refraction of the interfaces), or the fraction of reflectance, circular-annular outputs of infinite variability can be created. It should be noted that the light output from these annular emitters could also be polarized. Since a central cylindrical ejector 24 that employs Fresnel reflectance ejects primarily transverse polarized light, most of the ray bundles will be highly reflected on the first pass. The remaining longitudinally polarized light strikes the outside of the annular surface, which is highly reflective, and is turned 90°. The small amount of returning light will also be ejected as it is reflected off of a reflective bottom surface 295, after being directed downward by the 45° sloped walls of the cones.

Figure 30:
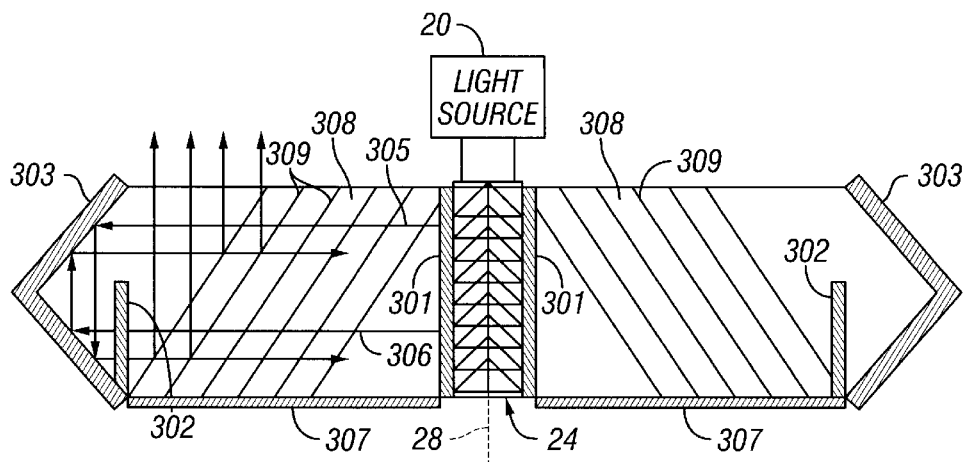
FIG. 30 is a cross-sectional view of a circular area emitter that utilizes polarization control.

Reference is now made to FIG. 30, which is a cross-sectional view of an alternative embodiment of a circular area emitter that utilizes polarization rotation principles to control reflectance of the rays emitted from the ejector 24. A circular polarizer 301 is situated surrounding to the centrally-positioned cylindrical ejector 24, and on the outside of the conical reflector a half-height circular retarder 302 (i.e. about half the height of the ejector 24) and a turning reflector 303 are provided. Polarizers (i.e. polarization retarders) are described with reference to FIGS. 13, 14, and 15 for example. Like the embodiment shown in FIGS. 29A and 29B, the embodiment of FIG. 30 comprises a number of hollow conical concentric cones 308, each having a height at least equal to the length of the cylindrical ejector 24. The interfaces 309 of the concentric cones have disposed therein a material that has a different index of refraction than the cones, thereby providing Fresnel reflection at the interfaces 309. The cylindrical ejector 24 is situated so that its central axis 28 approximately coincides with the central axis defined by the cones.

It may be noted that the output rays from the cylindrical ejector 24 are substantially polarized in one direction such that in FIG. 29, the conical Fresnel ejector 292 ejects them. However in FIG. 30 the circular polarizer 301 adjacent to the ejector 24 changes the polarization of the output so that it is not ejected on its first pass through the interfaces 309. After a ray has traveled through the interfaces, the polarization retarder 302 changes the polarization by about 90° and the turning reflector 303 and reverses direction of the ray so that, on the reverse pass, the light is ejected by Fresnel reflection from the interfaces 309. Operation of the turning reflector and half-height polarizer is described with reference to FIGS. 13A and 13B, for example. In general, it should be pointed out that the outer 90° turning reflector/polarizer should be designed so that the reflected light does not pass through the "device" twice. In some embodiments a hybrid retarder plate or devices based upon the Pockels, Kerr or Faraday effect can accomplish this if the device does not take up the whole outer conical surface. In addition, it may be advantageous in some embodiments to utilize a reflective surface 307 on the bottom of the conical reflector in order to redirect any light unintentionally directed downward.

For example, a first ray 305 exits the ejector 24, and then has its polarization changed by the circular polarizer 301. Due to the change in polarization, the first ray 305 is not Fresnel-reflected on its first pass through the interfaces 309. However, after being reflected by the turning reflector 303 and then having its polarization changed by the polarizer 302, the polarized rays will be ejected by Fresnel reflectance from the interfaces 309. Similarly, a second ray 306 passes through the interfaces 309 on its first pass and then is ejected only in the reverse direction after its polarization has been changed.

In FIG. 30, the maximum ejection occurs on the outside rings on the return pass. However, the area of the concentric cones is larger on the outside, and therefore may be more uniform.

Since the area of the concentric cones is smaller toward the center, there will be a potential increase in flux output per unit area. This can be balanced out by employing an internal retarder near the central ejector. In this case, the rays will be longitudinally polarized and will not be highly reflected on the surfaces near the center while the returning rays will be highly reflected. Use of non-45° slopes for the annular rings will aid or hinder the degree of polarization of the light depending on the incidence angles of the rays on the Fresnel reflecting interface. Where output flux efficiency is more important the slopes can be made such that the incidence angles are high and light is ejected in both polarization states more equally.

If it is desired to have the ejected light collimated from the concentric cones then this light could be redirected by adjusting the slope of the exit surfaces of the annular rings. In this case the correction could be made using refractive correcting surfaces at the exit annular ring. This can be accomplished by making the top surface of the annular ejector a conical surface, as all the correcting surfaces are the same slope.

9) Block Ejector in Annular Area Pyramidal Ejector

Figure 31A:
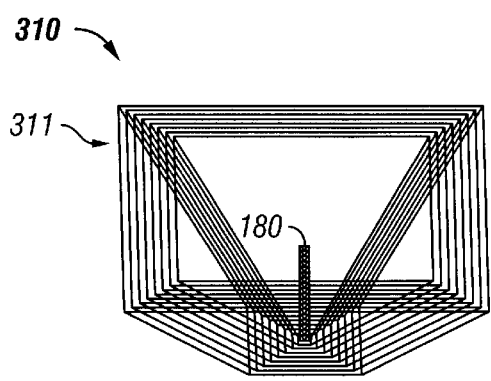
FIG. 31A is a perspective view of a four-sided emitter that includes a block ejector.
Figure 31B:
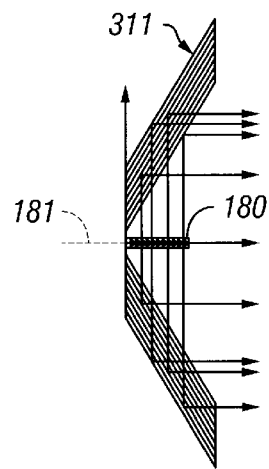
FIG. 31B is a cross-sectional view of a four-sided emitter that includes a block ejector as in FIG. 31A.

Reference is now made to FIGS. 31A and 31B. Generally, the approach described with reference to the cross-section of FIG. 30 can be extended to non-cylindrical configurations, such as N-sided pyramidal configurations. FIG. 31A is a perspective view, and FIG. 31 B is a cross-sectional view, of a four-sided emitter that includes a block ejector 180 (FIG. 18) centrally arranged about the central axis 181 within a number of concentric pyramidal structures 311 that have interfaces designed for Fresnel reflection. If the conical Fresnel ejector in FIG. 30 is replaced with a block ejector 180, and the conical annular rings are replaced with expanding concentric pyramidal structures shown generally at 310, then a rectangular-shaped output can be achieved, as shown in FIG. 31B. All the above techniques and design approaches described with reference to FIG. 30 can also be used with N-sided pyramidal configurations. FIGS. 31A and 31B illustrate a typical application using a linear block ejector 180 inside a rectangular annular ejector 311.

10) N-Shaped Polygon Ejector in Annular Area N-Polygon Ejector

In alternative embodiments, the ejector can comprise any of a variety of shapes that provide a corresponding variety of outputs. For example, in alternative embodiments the ejector can be further extended to include polygonally-shaped outputs of any number of sides, by using n-sided polygon ejector inside of a sequence of ever-larger equal sided polygonally ringed male/female of the same n-sided order.

11) Cylindrical Ejector—Output Less Than 360°

Use of Slits and Wraps

If it is desired that the output from the Cylindrical Ejector be less than 360° then a number of approaches can be employed. The first method is to wrap the ejector with a highly reflective material allowing a slit of light with the desired angular characteristics to output. The light output will be a mixture of collimated and non-collimated light. The slit does not have to be continuous but can be also a series of disconnected slits or apertures of any shape. The wrap can also be designed to move or rotate about the ejector.

Longitudinal Slices

The second approach is to cut longitudinal sections through the length of the cylinder. For example if the cylindrical Fresnel ejector is cut in half in the lengthwise direction then the light will be output only in a 180° of arc. The light that is ejected in this approach can be collimated light as the half-conical surfaces will work the same way as the full conical surfaces. This of course can be extended to sections that are more or less than 180°. The issue is the characterization of the light that is injected into the optical system. If the shape of the injected light matches the cross sectional shape of the ejector than the ejected light can collimated.

12) N-Sided Fresnel Ejectors—Output Less Than 360 Degrees

The approaches delineated in the last section can be extended to N-sided ejectors. For example, to create a half hexagon output one can either wrap three faces of the elongated hexagon sided prism or slice the prism in half along one of the axis where the edges on the prism are opposite each other.

13) Unsymmetrical and Complex Shaped Annular Area Ejectors

Unsymmetrical annular outputs can be created in a variety of ways. For example, by using one of the ejectors that have an output less than 360° together with annular rings placed only in the direction of the emitting light, a variety of area outputs can be created. For example if one used a half-cylindrical Fresnel ejector with annular "half moon" shaped rings then the area output would be a half circle. Also, the annular rings can be added on unsymetrically and the top surface shapes of the annular rings can be modified unsymetrically.

Special area emitting shapes such as the letters of the alphabet or other complex geometric shapes are possible to create via the use of a number of linear ejectors defining skeletal stick patterns imbedded in annular rings, which follow the defining contours of the stick shapes. For example, an "S" letter can be created by a series of block or cylindrical ejectors placed out at intervals in an "S" shape. The annular rings would be laid out in "parallel" surrounding each hub. It is possible to design a set of standard shapes that could be used to make a variety of letters of varying sizes.

Gradient Indexing of Interfaces

Figure 32:
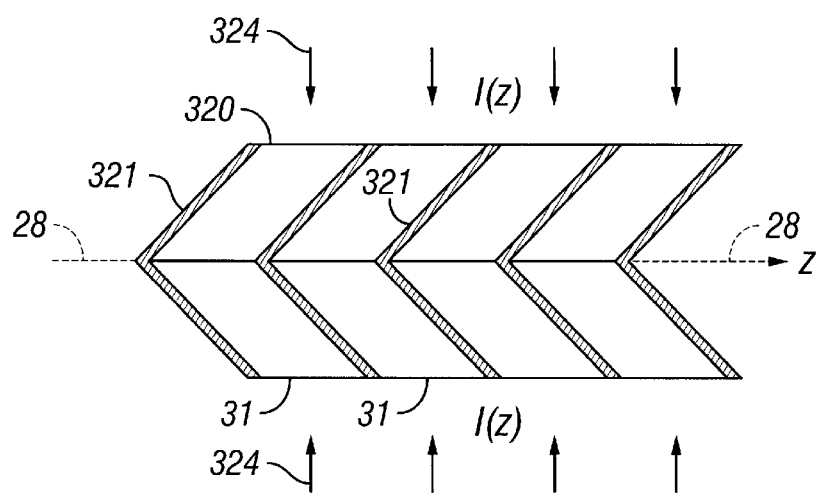
FIG. 32 is a cross-sectional view of an ejector that has photosensitive material in the gaps at each interface.

Reference is now made to FIG. 32, which shows a cross sectional view of an ejector 320 that comprises a photosensitive material 321 situated in the gaps at each of the interfaces between adjacent cones 31 (FIG. 3). The index of refraction of the photosensitive material 321 is set by applying a light beam 324 with a predetermined intensity pattern to transversely to the central axis 28 of the ejector 320. As was mentioned earlier, one of the techniques for adjusting the light output from a particular location on an ejector is to modify the index of refraction at its reflecting interface, so that it is a different value from its neighbors. This approach can be used to create different light intensity patterns; e.g. approximately uniform light outputs, light outputs with slowly varying values, or local spikes of light.

As discussed earlier, the use of a slowly varying index of refraction at successive interfaces could be used to create a uniform output from a cylindrical Fresnel ejector. The following discussion illustrates how this can be accomplished by adapting a technique used in the field of holography, although other techniques could be utilized. The technique can easily be generalized to create other light output characteristics.

As shown in FIG. 32, the photosensitive material 321 (such as photopolymers from Dupont or Polaroid) fills in the gaps at the interfaces between the cones 31. One interesting property of such photosensitive material is that the index of refraction n(z) changes with the incident light energy E(z), i.e., $$n(z)=f[E(z)],$$

where f is the characteristic function. Therefore, a slowly-varying gradient of index of refraction along the axis of the ejector can be created by exposing the ejector from the side with the light beam 324 that has a varying light intensity pattern. In one embodiment the light intensity pattern that slowly varies along the central axis 28, so that the index of refraction is greater at each successive interface. After the initial light exposure has set the index of refraction, the gradient of index of refraction can be permanently fixed through UV curing.

The nominal index of refraction of such photopolymers is around 1.5. After exposure, the index of refraction change can be above 10%. Assuming a refractive index of 1.5 for the cone material, a refractive index of 1.3 for the photosensitive material after exposure, and an incident angle of 45°, the reflectivity for the perpendicular polarization component is then close to 3%. Therefore, in this case, it is possible to create a gradient of reflectivity varying from about 0% to about 3% along the ejector axis at each interface. This is a practical range of values for most applications.

Specialty Collimators for Use in Ejectors

There are numerous types of collimators that are available for use with the linear and area ejector designs enumerated in this document. However, annular output collimators are not common. Also, most existing collimator devices produce light sources that are circular in cross-section. Some of the ejector designs herein described require collimators that are not circular in cross section. What follows are collimator designs that may be used in the above-defined technology.

Collimator with an Annular Circular Output

Figure 33:
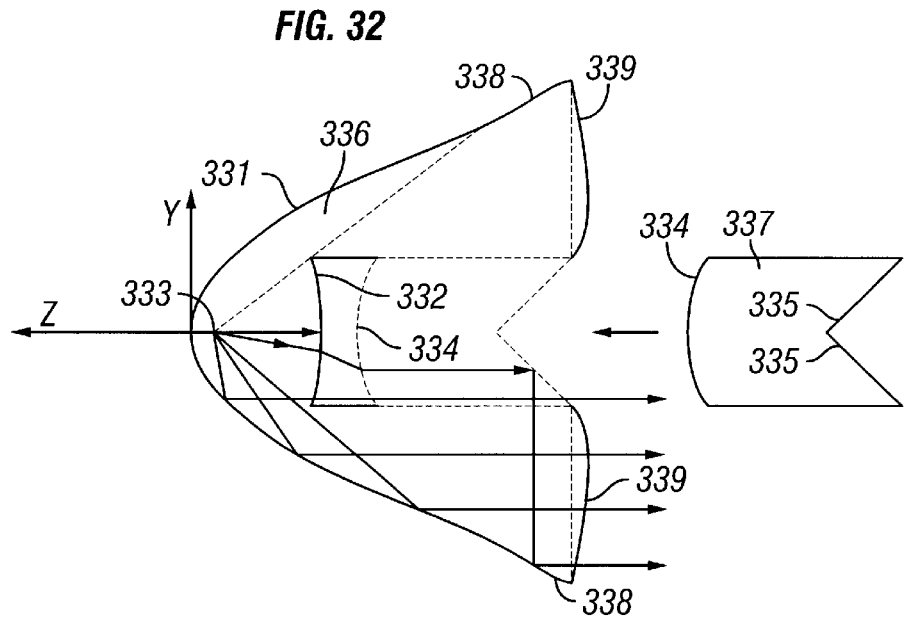
FIG. 33 is a cross-sectional view of a two-piece collimator that can produce an annular output.
Figure 34:
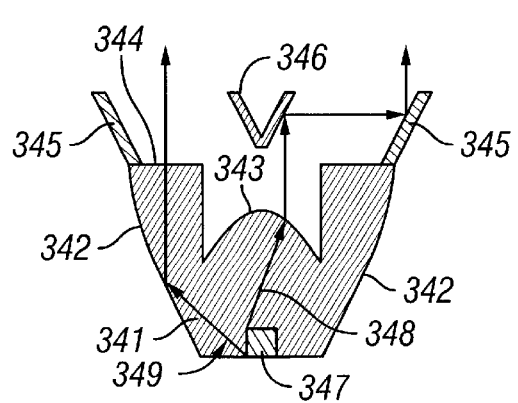
FIG. 34 is a cross-sectional view of an alternative collimator that can produce an annular output.
Figure 35:
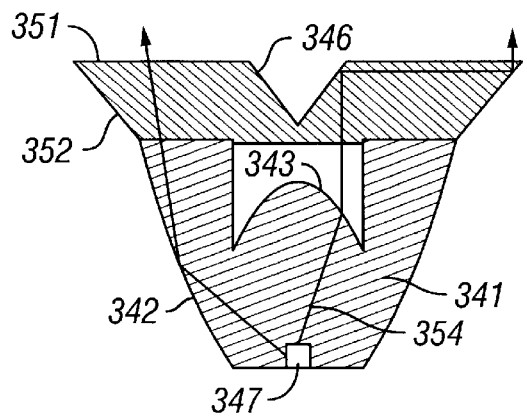
FIG. 35 is a cross-sectional view of another alternative collimator that can produce an annular output.

Reference is now made to FIGS. 33, 34, and 35 to illustrate collimators that can be used to inject a substantially collimated annular beam into the ejectors; For example these collimators can provide the annular beam 74 supplied to the outer interfaces of the cylindrical zigzag ejector shown in FIG. 7.

FIG. 33 is a cross sectional view of a collimator that comprises a solid dielectric outer lens 331 in the shape such as a paraboloid or a compound parabolic shape rotated symmetrically 360°. An internal air lens is defined by a concave spherical surface 332 and a concave paraboloid or ellipsoidal surface 334 opposite the spherical surface. A light source 333 is centrally situated on the z-axis, which is the axis of radial symmetry. The air lens collimates the light from the source 333 toward a conical reflector 335 that has the same diameter as the air lens. The conical reflector 335 reflects the collimated light 90° to the outer conical reflector 338 which then collimates the light along the axis of the lens. Any rays that do not strike the air lens will strike the outer edge 331 of the CPC/Paraboloid solid lens and are collimated along the z-axis via total internal reflection (TIR) or direct reflection (e.g. the lens can be coated with a metallic reflective material). The edge of the air lens is in line with the sectional extension of the outer cones and the center of the light source. The diameter of the central reflective cone should be approximately one-third the larger diameter conical section.

In FIG. 33 the collimator is formed in two parts. A first part 336 is the main Paraboloid/CPC lens with the internal concave spherical surface 332. This piece also contains the outer conical reflector 331 and optional correcting lens 339 (if any). The second part is an insert 337 that includes the inside conical reflector 335 on one side and the concave surface 334 that forms part of air lens on the other. This second piece can have cylindrical outer walls. The second piece can be sonically welded in place or be attached by an adhesive bond or other suitable bonding method.

The ejection surface of the lens can have a correcting lens 339 that can be used, for example to adjust for aberrations associated with the output from the Paraboloid/CPC lens 331 and the conical reflectors as a consequence of the light source not being a point source.

There are variations on the above design that can also be used to create annular circular output. FIG. 34 is a cross-sectional view of a collimator comprising a solid dielectric body 341 that defines an outer lens 342 in the shape such as a paraboloid or a compound parabolic shape rotated symmetrically 360° and an interior lens 343. The body comprises a flat surface 344 that is transmissive. Surrounding the flat surface 344 is an annular reflector 345. A conical reflector 346 is situated above the inner lens 343, and held in place by any suitable structure, such as a "spider" holder used in telescopes and other optical devices. In operation, for example, a small source 347 centrally located in the dielectric 341 emits a first ray 348 which is refracted by the lens 343, then reflected by the conical reflector, and then reflected out by the annular reflector 345. A second ray reflects off the outer lens 342, transmits through the flat surface 344, and then exits.

In the above embodiment there are a few variations that should be noted. First there is the option to have correcting surfaces on the "annular" top of the base solid lens. For some applications where a high degree of collimation is required this would be useful. The calculation of the shape of correcting surface is done on an application by application basis but is based on the principle of adjusting direction by refraction. For many applications the flat top will be sufficient.

FIG. 35 is an alternative embodiment of FIG. 34 that comprises a solid upper part 351 made of a solid dielectric and a solid lower part 341 made of a solid dielectric. The upper part defines the conical reflector 346 which can operate by total internal reflection. The conical shape is defined by a female void in the solid dielectric part 351. Furthermore, the perimeter 352 of the upper dielectric part provides a reflective surface. In operation, for example a first ray 354 emitted from the source is refracted by the lens 343, then enters the upper part 351 where it is reflected at the conical reflector 346 and again at the perimeter 352.

It is should be pointed out that the previously described annular collimators can be also be used as more traditional collimators by removing the upper conical reflectors from the design. (In the first design this can be accomplished by filling in the central conical hole with a solid material). In these cases, the output will be circular and will fully flash the optical aperture.

Rectangular Annular Collimators

Reference is now made to FIGS. 36A, 36B, 36C, 37, 38, 39, and 40 to illustrate a collimator that can generate an output beam with an approximately n-sided outer perimeter and an approximately n-sided inner perimeter. In the embodiment disclosed, the outer and inner perimeters are approximately square; in other embodiments other shapes and/or a different number of sides may be utilized.

Figure 36A:
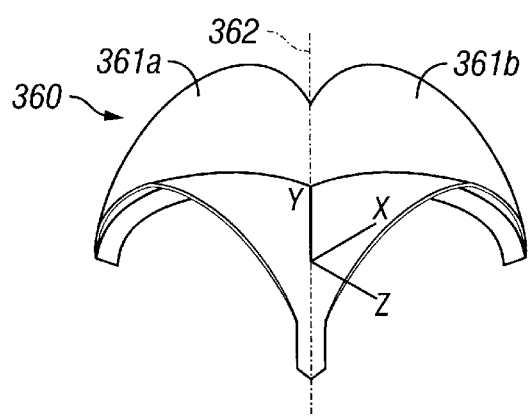
FIG. 36A is a perspective view of a four-fold rectangular annular collimator.
Figure 36B:
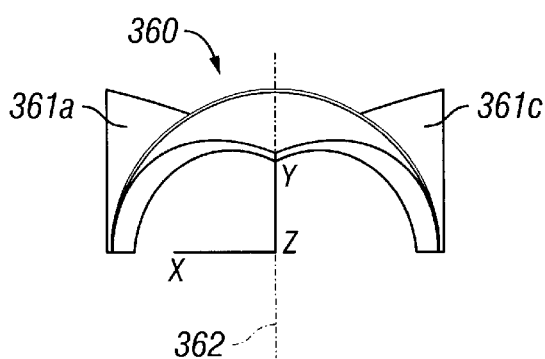
FIG. 36B is an elevational view of the four-fold rectangular annular collimator of FIG. 36A.
Figure 36C:
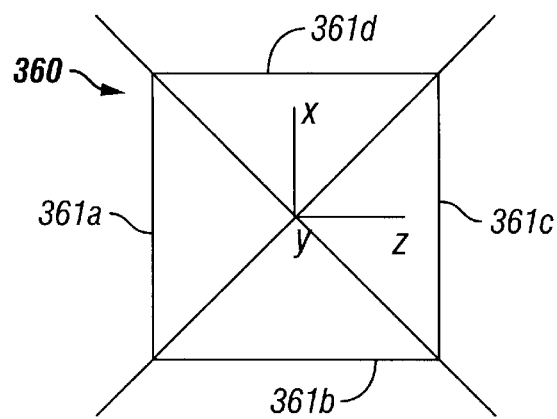
FIG. 36C is a plan view of the four-fold rectangular annular collimator of FIG. 36A.

FIGS. 36A, 36B, and 36C (collectively FIG. 36) illustrate a four-fold symmetrical paraboloid reflector cluster 360 from several views. FIG. 36A is a perspective view that shows a first paraboloid reflector 361a and a second paraboloid reflector 361b clustered symmetrically about a central axis 362. FIG. 36B is an elevational view cut through the cluster 360, and FIG. 36C is a plan view.

This embodiment uses the reflector cluster 360 provided by the intersection of four paraboloid surfaces at 90° rotation relative to each other as the primary reflector. Particularly, the four intersecting paraboloid reflectors 361a, 361b, 361c, and 361d reflect light from the source (which is below the geometric center of the reflector in plan view) in four orthogonal directions when looking at it from the plan view. The inclination of the reflected rays can be adjusted to exit at an angle from below the horizontal to up to the horizontal (and above) by adjusting the shape of the paraboloid surfaces and their position with respect to the source. In the design example that follows, the light is reflected at an angle below the horizontal after striking the 'complex' reflector. The reflected light is then secondarily and sometimes tertiary reflected upward via a pyramidal reflector shown in perspective view in FIG. 37.

Figure 37:
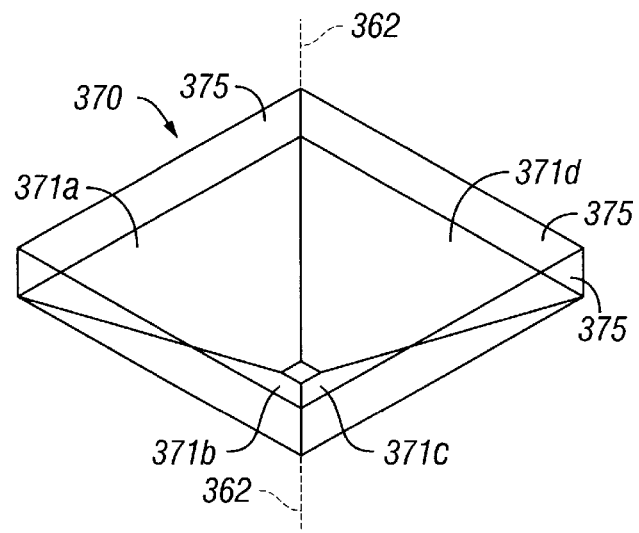
FIG. 37 is an isometric view of a base reflector used in conjunction with the four-fold rectangular annular collimator of FIG. 36A.

FIG. 37 is an isometric view of a base reflector 370, which in this embodiment comprises a pyramidal reflector that includes a first, second, third, and fourth approximately flat base reflective surfaces shown respectively at 371a, 371b, 371c, and 371d arranged symmetrically about the central axis 362. For purposes of reference, the central axis 362 is aligned in the vertical direction. In this case each of the base reflective surface 371a–d of the pyramid make an angle of 28° with the horizontal plane (normal to the central axis 362). In this embodiment the base reflector 360 also has four reflective walls 375 that extend approximately vertically from the reflective surfaces 371a–d.

Figure 38:
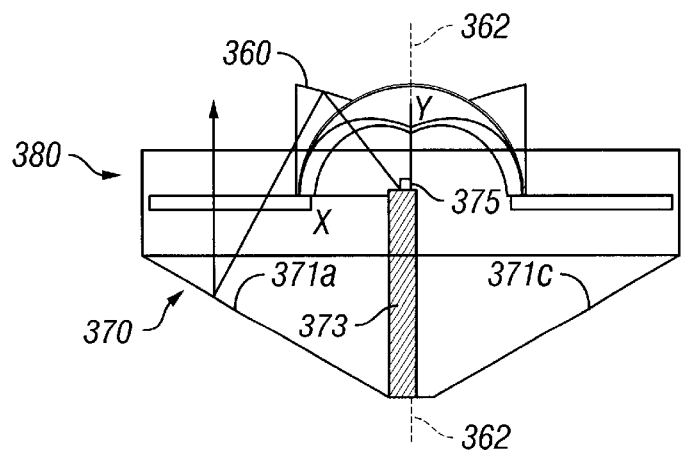
FIG. 38 is a sectional view of a collimator including the four-fold rectangular annular collimator of FIG. 36A combined with the base reflector of FIG. 37.

FIG. 38 is a sectional view of a collimator that includes the paraboloid cluster 360 situated over the pyramidal base reflector 370, aligned with respect to the central axis 362. A mount 373 for a light source 375 that comprises a small light source such as an LED is aligned with the central axis 362. FIG. 38 illustrates the overall design and configuration of the paraboloid collimator. The light source 375 is just above the 0,0,0 position (the origin) in the drawing, which is situated proximate to the four focal points of the four paraboloid reflectors 361a–d. The extent of collimation of the output beam varies between embodiments.

Figure 39:
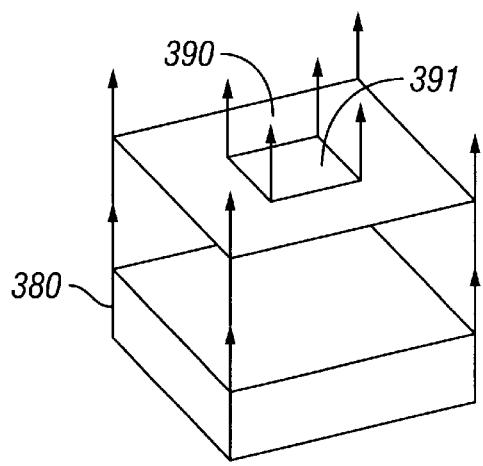
FIG. 39 is a perspective view of the near field exit beam emanating from the rectangular annular collimator.

FIG. 39 is a perspective view of the near field exit beam 390 from the paraboloid collimator. This view indicates there is a central area of the light ray bundle, which in the near field has a distinct hole 391 in it caused by the paraboloid cluster 360 (FIG. 36). In the far field, the hole will fill in dependent upon the extent of collimation of the exit beam. A ray tracing of the output of the device with a light source assumed to be 0.25 mm in size, indicates that the output of the paraboloid collimator is approximately rectangular in shape and fairly collimated.

The above-mentioned design is not as efficient as is theoretically possible with the system where the paraboloid surfaces redirect more of the rays from the source to the base reflector. However, the sample design (shown in the above figure) is indicative of the optical approach and the benefits of it. The parabolic reflective surfaces 361a–d can be designed so that the reflected rays from these surfaces are ejected in the horizontal plane. In this instance these rays can be collimated via the use of a pyramidal reflector with its bottom surfaces at a slope of 45° to the horizontal.

In one embodiment the pyramidal structure may be raised to a higher position than the one shown in the example of FIG. 38. If the pyramidal structure is raised, it allows for the light source and its mounting hardware to have an entrance port at the central base of the pyramidal structure. Then, the overall device can be designed so that none of the reflected rays from the light source will intercept this area. The support of the parabolic reflector can be handled via structural connections to the reflector base.

Figure 40:
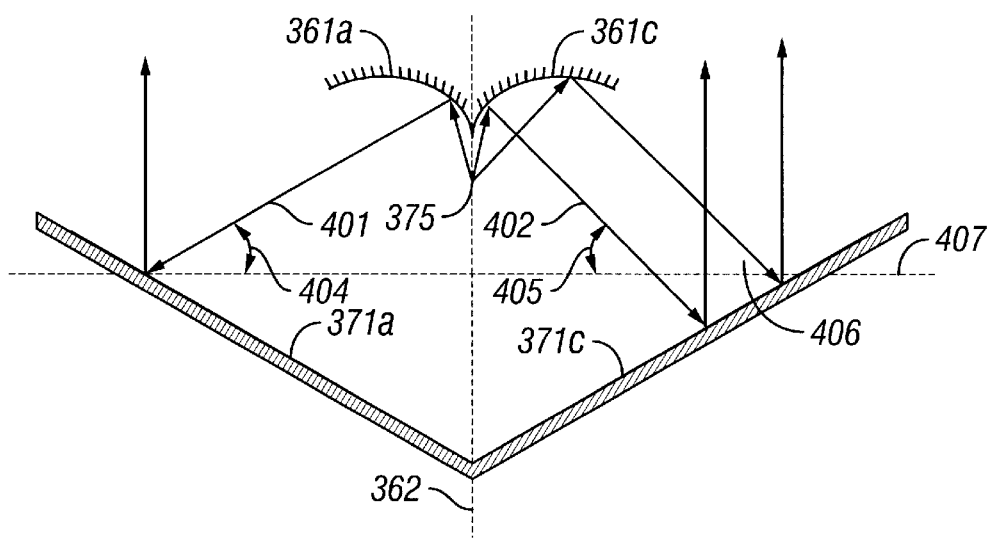
FIG. 40 is a sectional schematic view of one embodiment of the four-fold annular collimator.

FIG. 40 is a cross-sectional schematic view of one embodiment of the paraboloid collimator including cross sections of parabolic reflectors 361a and 361c, and base reflectors 371a and 371c. FIG. 40 shows several exemplary rays emitted from the source 375, including a first ray 401 that reflects from the first paraboloid reflector 361a and then off the base reflective surface 371a, defining an angle 404 with respect to a horizontal reference plane 407 orthogonal to the central axis 362. Similarly, a second ray 402 and a third ray 403 emitted from the light source 375 reflect from the third paraboloid reflector 361c and the third base reflective surface 371c at angles shown at 405 and 406 respectively with respect to the horizontal reference plane 407. In this embodiment the first, second and third rays make approximately same angle with the horizontal reference plane (i.e. the angles 404, 405, and 406 are approximately equal) but are oriented into one of the four directions in the device. Although FIG. 40 shows a cross-sectional view, it should be clear that in the actual device the light emitted from the source 375 will be oriented in four orthogonal directions using the four-fold parabolic surface reflector, and accordingly in such embodiments sets of rays in each quadrant are parallel to each other.

Figure 41:
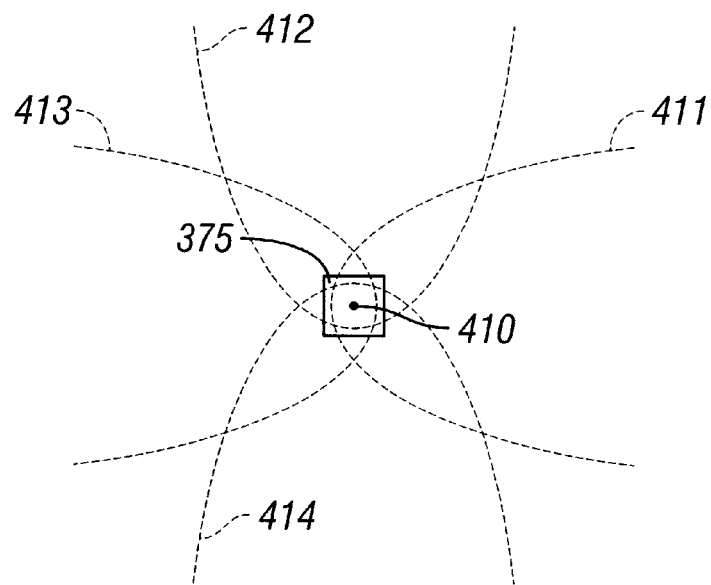
FIG. 41 is a diagram illustrating derivation of the geometry of the four-fold annular collimator.
Figure 42:
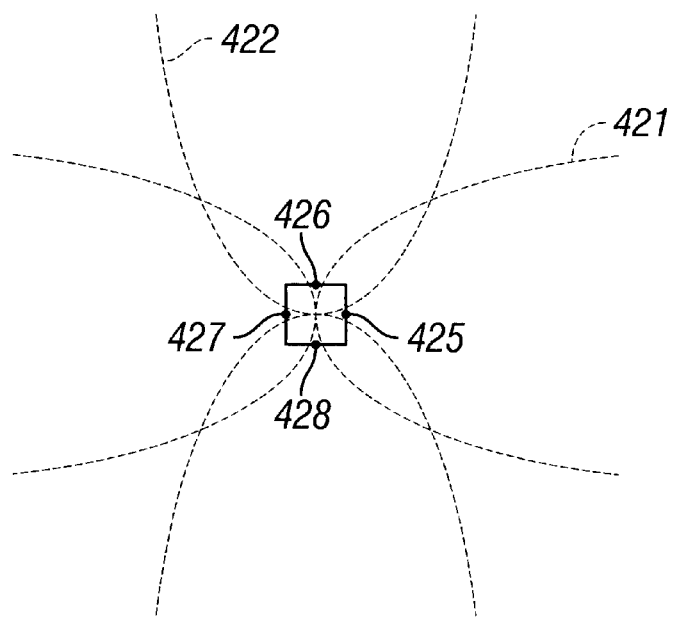
FIG. 42 is a diagram illustrating derivation of the geometry of an alternative embodiment of the four-fold annular collimator.

Reference is now made to FIGS. 41 and 42 to illustrate two design approaches. The configuration of the four paraboloid surface can take many forms as is required for various applications. One approach to creating a particular design can be described as follows. Once the source size and shape is determined and the angular directional and light-profile requirement of the device is established, a single paraboloid surface is chosen which forwardly directs light into one of the four orthogonal light bins with the proper attributes. The paraboloid's (also known as a parabolic toroid) acceptance angle and the axis of tilt with respect to the horizontal are adjusted, as per the design goals. As shown in FIG. 41, in one approach the focus of the paraboloid is located either at the center 410 of the light source 375, or proximate to the center of the light source such that approximately half the rays of the source will be well collimated into the direction of the light bin by the paraboloid reflector. Particularly, in the four-paraboloid embodiment shown in FIG. 41, a first parabola shape 411, a second parabola shape 412, a third parabola shape 413, and a fourth parabola shape 414 all have their focal points proximate to the center 410.

In some embodiments the paraboloid could be replaced by a reflector that geometrically is a combination of two parabolic curves tilted on their axis relative to each other and rotated 360° around the common main axis. Reflectors based on these so-called CPC geometries typically have somewhat better efficiency for larger sources of light than paraboloid reflectors.

The design of CPCs is well established. One source of information on how to design these type of geometrical reflectors is given in the book, High Collection Nonimaging Optics, W. T. Welfors and R. Winston, Academic Press, New York, 1989. Another surface that may also be used in the design instead of the paraboloid or CPC, is an elliptical toroid. Other surfaces may be employed and can be chosen by one skilled in the art. One can choose the shape based on a variety of criteria; For example, one could use a confocal parabola to achieve uniform output if the source shape is spherical. Once the paraboloid, CPC or elliptical toroid or other shape reflector is chosen, three copies of the geometrical object are created by rotating the first surface around a common focal point on the source at 90° intervals.

FIG. 42 is a diagram of paraboloid design that shows an alternative embodiment in which the center of the focus of each of the Paraboloids, CPCs, etc. is placed at a unique point just outside the center of the source in the plan view. Particularly, a first parabolic shape 421 has a focus at a first focal point 425, a second parabolic shape 422 has a focus at a second focal point 426, a third parabolic shape has a focus at a third focal point 427, and a fourth parabolic shape has a focus at a fourth focal point 428. In this approach the four focal center points 425, 426, 427, and 428 are adjacent to, but not on the center of the source. If connected together, the focal points may form a square whose center is the center of the source in plan.

The next step to create the final four-fold shaped single surface is to perform a series of Boolean and other geometric operations on the four surfaces of revolution so as to eliminate the unwanted portions of the geometry. It should be clear that there are a series of intersections of the surfaces of revolution that form a number of space curves. There are typically eight primary space curves formed from the intersections of the surfaces. These curves may be altered if the surfaces are placed so that they don't fully overlap each other. We are only interested in using the geometry, above the source, whose starting boundary is defined by the four space curves formed by the "upper" intersections of the surfaces of revolution.

The extraction of the geometry we are interested in can be readily accomplished in a number of CAD programs such as MicroStation™, SolidWorks™, AutoCAD™, or other suitable program. The surface model can then be converted into a solid model by specifying a thickness to the surface. The solid or surface models then can be output via standard formats such as IGES, SAT or others to CAM machines for manufacture of the part.

N-Sided Annular Collimators

The method for producing the four-sided collimator can also be extended to other shapes. For example, a five-sided collimator can be created using a surface of revolution in a similar manner to the four-directional collimator by rotating it about a source where the copies are placed at every 72° of rotation. In the case of the five-fold collimator, the original surface of revolution would necessarily be designed to have a slightly smaller optical acceptance angle to better handle high incidence angle rays from the source.

As with the four-fold collimator, the angle with respect with to the horizontal of the collimated rays can be adjusted up or down as needed. Also, the bottom pyramidal reflector would be chosen so it has the same number of sides as the upper reflector. All the methods described in the design of rectangular annular collimators can be extended to the n-sided case. For example, the number of space curves created by the intersections of the surfaces will typically be equal to the number of sides times two. Therefore, for a five-sided annular collimator there will be five upper space curves from the intersections, which can be modeled using a CAD program to extract the final geometry of the reflector.

Combining Ejectors

Figure 43:
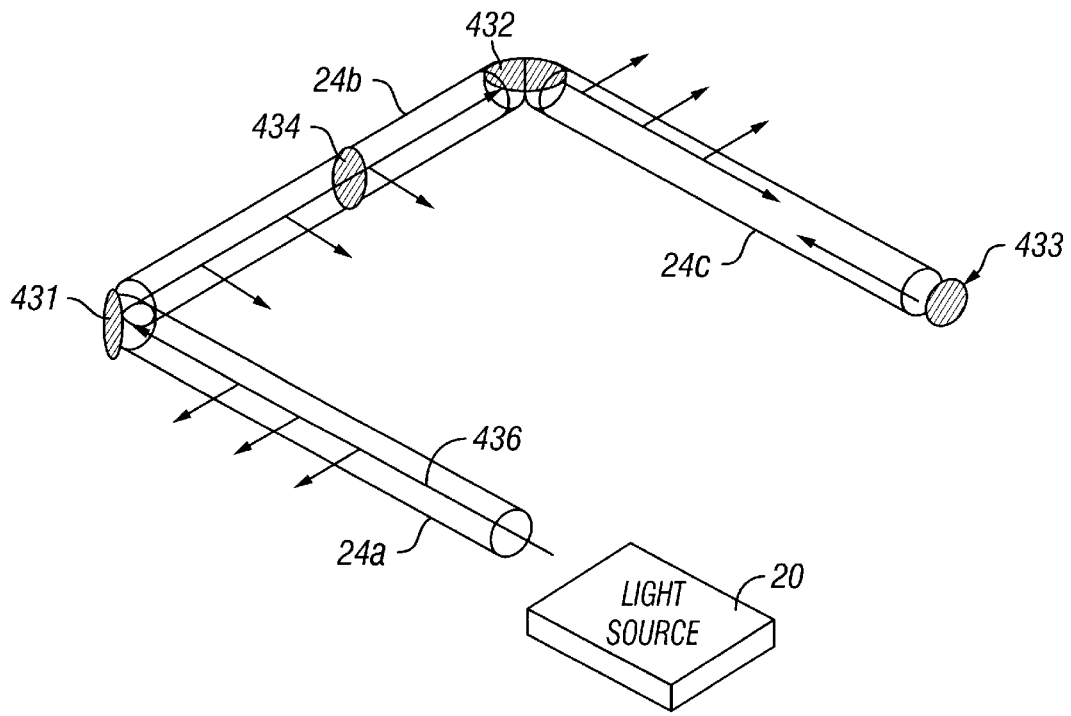
FIG. 43 is a schematic view of plurality of optically interconnected cylindrical ejectors.
Figure 44:
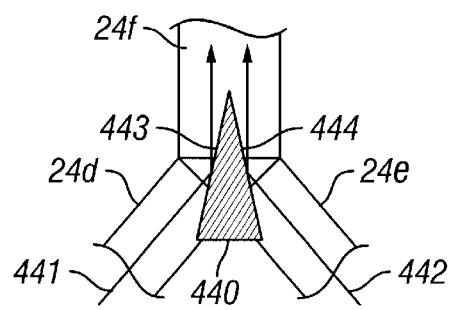
FIG. 44 is a sectional view of an interconnection between three cylindrical ejectors.
Figure 45:
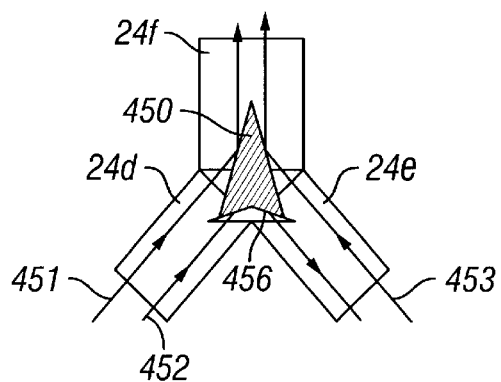
FIG. 45 is a sectional view of an alternative interconnection between three cylindrical ejectors.

Reference is now made to FIGS. 43, 44, and 45 to illustrate embodiments in which two or more linear ejector units can be combined. Particularly, the ejectors described herein can used as stand-alone components or connected to one or more ejectors of either the same type or of a different type either in series, parallel, or combinations thereof. Furthermore, an individual ejector can also geometrically be made up of a number of one-directional components situated on axis (e.g. nested conical male-female surfaces) or dualsurface directional components (inner conical with outer opposing direction conical nested surfaces) or of a multi-directional geometry of any order. When more then two linear ejectors are connected together their axes may be co-planar, or not, depending upon the particular application. The optical linkage between two ejectors typically can be accomplished by using a flat turning reflector (for collimated, or near collimated, light sources) of the correct geometric shape that is placed at an orientation angle such that the angular bisector of the vertex angle where the axes of the two ejectors meet, is normal to the plane of the reflector. For example, the turning reflector for two abutted cylindrical ejectors whose axes make a 90° bend is in the shape of a flat ellipse (it can be larger or of a different shape than this for manufacturing purposes) which is oriented 45° to either of the linear ejectors.

FIG. 43 is a perspective diagram of three cylindrical ejectors 24a, 24b, and 24c optically linked together in series at approximately right angles (i.e. 90°) to each other. Particularly, the first cylindrical ejector 24a receives light from the light source 20 at a first end, the light is partially reflected as it propagates through the ejector. At the opposite end of the first ejector, a first elliptical turning reflector 431 is arranged to receive the light transmitted therethrough, and inject it into a first end of the second cylindrical ejector 24b, and at the opposite end a second elliptical turning reflector 432 reflects the remaining transmitted light into a first end of the third cylindrical ejector 24c. At the opposite end, an appropriate turning reflector 433 (e.g. flat or conical) is arranged to reflect any remaining light back into the third cylindrical ejector, reversing its direction 180°. A half-size circular retarder may also be used with a conical turning reflector to rotate the polarization by 90°. Examples of end sections that can reverse direction and change polarization are shown in FIGS. 13, 14, and 15 for example. Another example is the grooved reflector discussed with reference to FIGS. 24 and 25, which comprise a set of parallel grooves arranged so that their grooves make about a 45° angle with the expected polarization of the incident light. Such a grooved reflector can be manufactured at low cost by injection molding plastic into the desired shape and then depositing a layer of metal on its grooved surface by any suitable method such as vacuum deposition.

In FIG. 43, the second cylindrical ejector 24b has a full aperture size transmissive circular retarder 434 situated therein. Generally, a circular retarder can be used at any place along a series connections of linear ejectors, to adjust the state of polarization of the light as necessary or desirable. For example this technique can be used to either increase or decrease the amount of light ejected at a particular location and beyond it. These retarders can be the full aperture size of the ejector, or a portion of an aperture. Fine-tuning the amount of radiation ejected at the interfaces can also be achieved by turning the states of polarization of a source less than 90°.

This can be done for example with transmissive plates of a suitable material and thickness that exhibits the property of optical activity.

In FIG. 43, a first ray 436 injected from the source 20 propagates through the first ejector 24a, is reflected by the first elliptical turning reflector 431 into the second ejector 24b, ts polarization is changed by the circular retarder 434, it is reflected by the second elliptical turning reflector 432 into the third ejector 24c, and then is reversed in direction (and possibly its polarization changed) at an end section 433, from which it propagates through the system in the reverse direction. It may be noted that the ejected rays from the ray 436 change orientation, from one ejector to the next.

It is illustrated in FIG. 43 that the same techniques and components to return the non-ejected rays back for a second pass, as was shown in the discussions for individual ejectors, such as with reference to FIGS. 13, 14, and 15.

The orientation of the ejection surfaces can be different in each of the ejectors of an interconnected stack of linear ejectors. For example, there could be two light sources of light, one on either side of the stack; i.e. in FIG. 43 the end section 433 would be replaced by another light source that injects light into the end of the third ejector 24c. In this case, the orientation of the surfaces for the initial ejectors nearest the light sources would be opposite each other, which may be useful in achieving uniformity in the stack of ejector, as more central ejectors will receive more combined light from both sources than the ones nearest the two sources.

FIG. 43 shows a series connection between the first, second, and third ejectors. Linear ejectors can also be connected in parallel, whenever the number of ejectors meeting at a vertex is more than two.

Reference is now made to FIGS. 44 and 45 to illustrate embodiments in which turning reflectors are configured to create parallel interconnections between ejectors. There are many options for creating an interconnection. For example, if there are three linear ejectors impinging at one vertex, as in FIGS. 44 and 45 there are a number of ways to create an interconnection. First one must decide what direction/s the primary radiation is coming from and where it is supposed to go.

FIG. 44 is a sectional view of a three-way connection between a first cylindrical ejector 24d, a second cylindrical ejector 24e, and a third cylindrical ejector 24f. A conical or wedge-shaped turning reflector 440 is situated at a junction between the first, second and third ejectors, arranged so that primary ray bundles traveling through the first and second ejectors are reflected therefrom into third ejector. Particularly, a first ray 441 traveling in the first ejector 24d is reflected from a reflective surface 443 into the third ejector 24f, and a second ray 442 traveling in the second ejector is reflected from a second reflective surface 444 into the third ejector 24f.

FIG. 45 is a cross-sectional view of an alternative embodiment of an interconnection in which a first, second, and third ejector 24d, 24e, and 24f interconnect, but the direction of the ray bundles is reversed. Specifically, a turning reflector 450 arranged at the interconnection between the ejectors includes upper turning surfaces that operate as in FIG. 44 to reflect light from the first and second ejectors into the third ejector, but in addition includes a reverse turning surface 456 that reflects some of the rays from the first to the second ejectors and vice versa. For example a first ray 451 traveling in the first ejector is reflected into the third ejector, while a second, ray 452 traveling parallel in the first ejector is reflected from the reverse turning surface into the second ejector. It should be apparent that the reverse would also occur; i.e. a ray traveling in the second ejector could be reflected into the first ejector. A third ray 453 traveling in the second ejector is reflected into the third ejector. Thus, FIG. 45 illustrates a system that splits a single ray bundle into two bundles, each entering one of two ejectors.

For interconnected ejectors such as in FIGS. 44 and 45, the design of Turning Reflectors for most geometric configurations is arrived at by application of the geometric optical laws of reflection. However, some design considerations require the development of more complex turning reflectors than the simple cases discussed so far. For example, in FIG. 45 a portion of both of the exiting ray bundles includes some fraction of the rays that enter the other emitting ejector, while the remainder of the radiation enters the neutral or non-emitting ejector and/or where the source ray bundles are not collimated into the stack(s).

Using the principles set forth herein even more complex Turning Reflectors can be designed that employ optical components that combine the principles of refraction, normal reflection, diffraction and total internal reflection. Complex devices such as these may be useful for designs where there are a sizable number of ejectors being coupled together at a single juncture and/or where the source ray bundles are not collimated in the stack(s).

LCD Illumination: Designs for Frontlights and Backlights for LCDs

Frontlights and backlights are used extensively to illuminate Liquid Crystal Displays (LCDs). One problem is how to design frontlights and backlights that are both highly efficient and compact in size. The following novel designs show how the ejector optical concept described herein can be used in combination with other optical components to meet this problem.

For reasons of efficiency and functionality, light from frontlights and backlights should strike the two polarizers and liquid crystal layer of the LCD, at an incidence angle near normal to the faces of the two polarizers and liquid crystal layer. Typically, this angle of incidence can be extended to up to 20° from the normal. This is more easily achieved in an LCD that has a backlight than one with a frontlight; as it is difficult to design a compact and efficient frontlight, which both sends light at the correct angle of incidence without blocking the light from escaping, or causing a distortion in the image emerging from the display.

LCD Illumination: Example of a Frontlight Design

Figure 46:
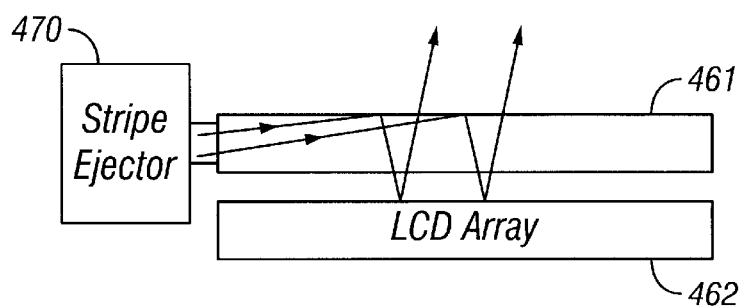
FIG. 46 is an end view of a striped ejector illuminating an LCD array with a holographic component.

Reference is now made to FIG. 46 which is an end view of a stripe ejector 470 (FIG. 47) injecting a stripe of light into a holographic optical component 461, which redirects the injected light downward to where it reflects from a reflective LCD array 462, which comprises a plurality of LCD elements such as for a digital display. The reflected rays from the LCD 462 transmit through the holographic element to the viewer. The holographic optical component comprises any suitable component for redirecting light downward: there are a number of transmissive optical devices that have the ability to take grazing incidence light and turn it approximately 90° (or normal) to plane of the hologram. Both volume and edgelit holograms have been developed that can accomplish this efficiently. There are holographic optical components that will in addition allow light near normal to the surface to pass through largely unimpeded. The so-called cutoff angles where one effect takes precedence over the other must be understood to utilize these components in a frontlight device. Typically, the hologram will not redirect the grazing light exactly normal to surface but at an angle of between 7° and 10° off of the normal. This is acceptable for the frontlight. Light rays reflected off of the reflective LCD 462 at this angle and back to the hologram are readily transmitted through the hologram without being distorted. In fact there are holograms which can do this with a range of incidence angles. Typically, the maximum beam spread can be from 6 to 7.5° half angle incident on the hologram face. FIG. 46 illustrates this principle.

One advantage of the edgelit hologram over the volume hologram is in the compactness of the device. Edgelit holograms as thin as 3 mm have been produced that exhibit the properties described above. Patents for this technology include patent numbers U.S. Pat. No. 5,877,874 and U.S. Pat. No. 4,643,515. For example Imedge Technology Inc. has made a 3 mm thick edgelit hologram that performs well for this application, which requires collimated light that is incident on the edge at a 10° angle. Although the hologram was designed to work best at a wavelength of 532 nm it has been found that the hologram worked well at many other visible wavelengths. This may be another advantage of the edgelit hologram versus the traditional volume hologram. In addition, the hologram performed well and did not substantially distort any image seen through the main face.

Figure 47:
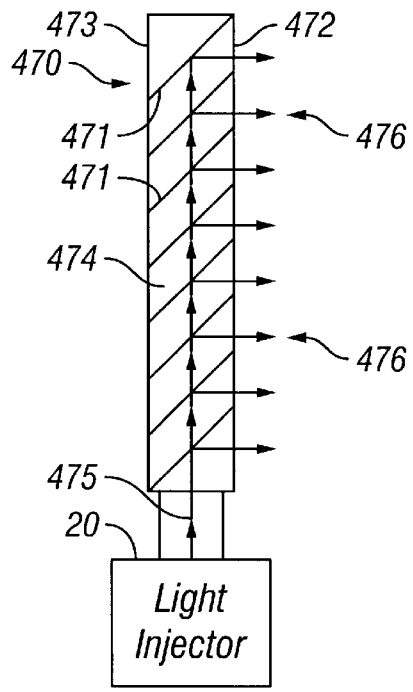
FIG. 47 is a top view of a striped ejector illuminating an LCD array with a holographic component.

Reference is now made to FIG. 47. In order to employ such a hologram in a frontlight, one must have an optic device that injects collimated light into the edge of the hologram, in a narrowly defined "stripe". There are a few available optic solutions for providing collimated light into thin lightguides. However, these traditional solutions are either expensive, inefficient or are not compact in size or shape. These issues can be resolved via the use of appropriately designed stripe ejector(s) such as shown at 470 in FIG. 47.

FIG. 47 is a top view of a stripe ejector 470 that comprises a sequence of parallel partially reflective surfaces 471, which are orientated at approximately a 45° angle to two opposing, substantially parallel edges 472 and 473. A first one of these edges, shown at 472 is where the light is ejected while the other edge, shown at 473, may be surfaced with a reflective layer. The stripe ejector 470 may be formed of a plurality of independent components 474. Looking from the top view of FIG. 47, the section of each individual component 474 takes on the form of a parallelogram. From the side view sectional view, each individual component 474 has the shape of a rectangle. Each individual component can either be individually bonded together using a suitable adhesive or bonding process, whereby the index of refraction is modified from the surrounding plates if Fresnel reflection provides the partially reflective properties. The interstitial filled gaps can also be created by cutting 45° slits in a solid block via such devices as a laser. For plastic this could entail the use of an excimer laser. Then the gaps are filled with a material, which is of a different index of refraction from the primary material to provide Fresnel reflection. Another approach to creating partially reflective interfaces is to form a semi-transparent metallic coating at the interfaces.

The light injector 20 provides collimated or partially collimated light having a rectangular shaped cross-section into the end of the stripe ejector 470. Circular or other shaped collimators can be used as well with either some loss of efficiency or the ability to only flash a partial section of the ejector. As was described in earlier descriptions of such devices, at each layer with a change of index of refraction, a collimated ray is reflected at a 90° angle to the incidence angle and therefore normal to the ejecting edge of the device. For example, a ray 475 injected into the stripe ejector is partially reflected at each successive interface 471 to provide an output 476.

Figure 48:
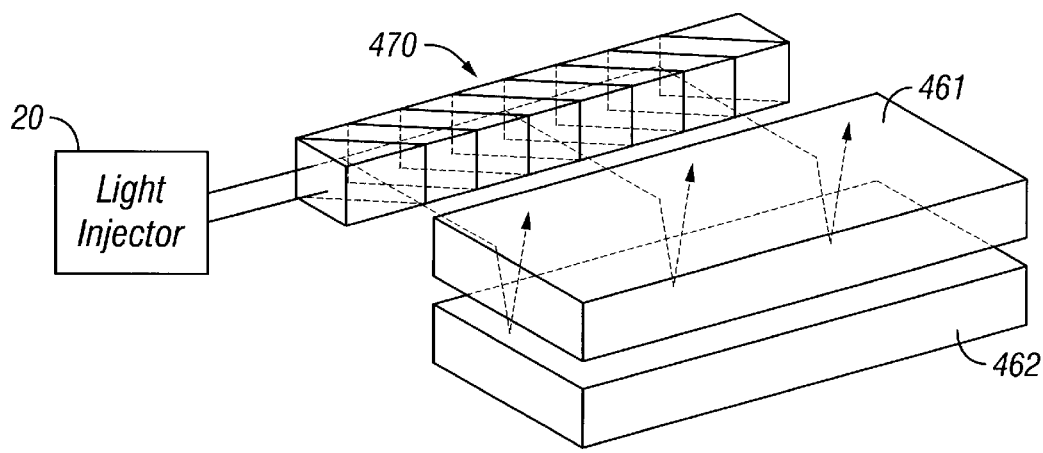
FIG. 48 is perspective view of an arrangement for front lighting an LCD with a stripe ejector and a holographic element.

Reference is now made to FIG. 48, which is a perspective view of an arrangement for front lighting an LCD. Particularly, the stripe ejector 470 pumps light from the light injector 20 into the holographic component 461. The light is reflected off the top surface of the component 461, and then reflected again from the LCD 462. The light reflected from the LCD then propagates substantially directly through the component 461 to provide an output.

In embodiments that utilize Fresnel reflection at the interfaces, the light source is primarily polarized in the transverse state. As with previous designs, there are a number of ways to improve uniformity and efficiency of such devices. Uniformity can be improved by grading of the index of refraction of the interstitial Fresnel reflecting layers. Also, the use of a half height circular retarder at the end in combination with a 180° V-shaped turning reflector will send the rays back for a second pass. Finally, a second stack can be employed with the reflective layers in the stack turned 90° to the first stack. This stack can either be behind, in front, below or above the first stack. Based on previous calculations in this document uniformity can be improved by doubling the number of interfaces per unit length or by doubling the reflectance at each interface in the second stack.

Improvements in uniformity can also be achieved by having more than one ejector on either side of the waveguide. Of course this may necessitate a redesign of the characteristics of the hologram to accept light sources from two opposing directions.

Figure 49A:
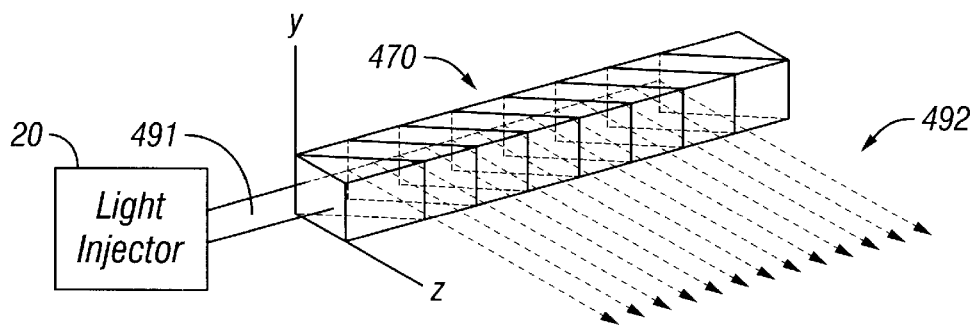
FIG. 49A is a diagram of a light output profile from a stripe ejector with a collimated source.
Figure 49B:
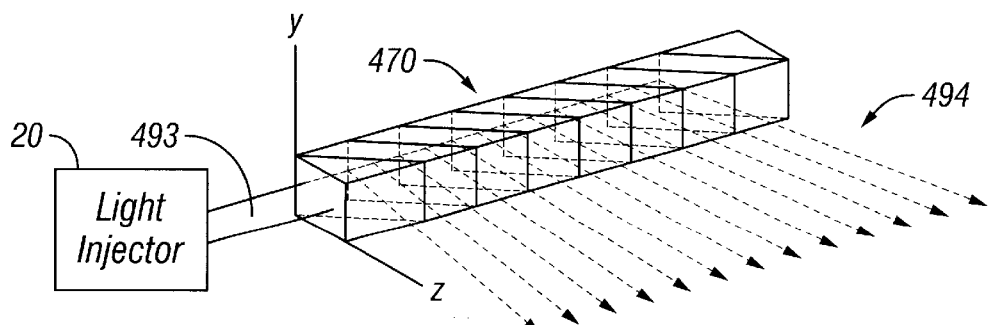
FIG. 49B is a diagram of a light output profile from a stripe ejector with a partially collimated source.

Reference is now made to FIGS. 49A and 49B: generally FIG. 49A shows the light output profile using a collimated source and FIG. 49B shows the output light profile using a partially collimated source. FIG. 49A is a perspective view showing that by providing a collimated beam 491 from the light injector 20, and rotating the ejector 470 around the long axis at an appropriate angle, substantially collimated light 492 is ejected at the required angle to the horizontal. This device can be coupled to the hologram via a dielectric interface or be designed to inject light across an air gap at the correct angle, as shown in FIG. 48. FIG. 49B illustrates the stripe ejector 470 operating as a slightly diverging light source, which is created by injecting a partially collimated light beam 493 from the light injector 20 into the end or ends of the stripe ejector 470. FIG. 49B shows that that result of utilizing a partially collimated beam 493 is a diverging light output 494.

LCD Illumination: Backlight Designs with a 45° Fresnel Ejector/Holographic Combination Devices In alternative embodiments, the front-light design described above can be adopted for use as a backlight. In this approach, the collimated or partially collimated light is injected into the lightguide and the bottom side of the hologram has a reflective coating or layer. An alternative approach is to use the hologram with one less mode. In this approach the light is only turned once by the hologram and is allowed to transmit through the upper surface of the hologram. Incorporation of a directional holographic diffuser could be incorporated into the assemblage replacing the traditional diffuser and brightness enhancing films.

LCD Illumination: Frontlight/Backlight with Redirecting Prismatic Sheets

The ejector device can also be used in conjunction with prismatic ejection and redirecting structures, to produce a workable frontlight. There are a number of commercially available prismatic based sheets that turn grazing incidence light approximately 90°. For example, the 3M company produces a product for this purpose under the name TRAF II. This may be more suitable for backlight applications as there is some degree of distortion when the light passes through these type of prismatic sheets. Other prismatic solutions are possible and may reduce the degree of distortion.

Polarization Considerations

Ejectors that employ Fresnel reflective layers typically produce light polarized to some degree. In the case of the 45° rectangular Fresnel ejectors for use in a frontlight or backlight, this polarization may be used to good advantage. It is well known that backlight and frontlight LCD systems typically sacrifice half of the light due to absorption in the polarizer. (There are two polarizers in most systems.) As normally they are working with either natural light or artificial light that is not polarized, the normal design approach loses 50% of the light. However, if the light source can be given a preferential ratio of one polarization state to another, this situation can be improved. For example, if the ejector produces only 20% of its light in the sacrificial polarized state, then the display device could be made more efficient. In this case, for a given amount of flux, the brightness of the images produced by such a display will be a factor of 80/50. Because contrast perception for a person is nonlinear phenomena, this improved brightness will have significant effects on the readability of a display.

Emitter Construction (Sawtooth Embodiment)

Figure 53:
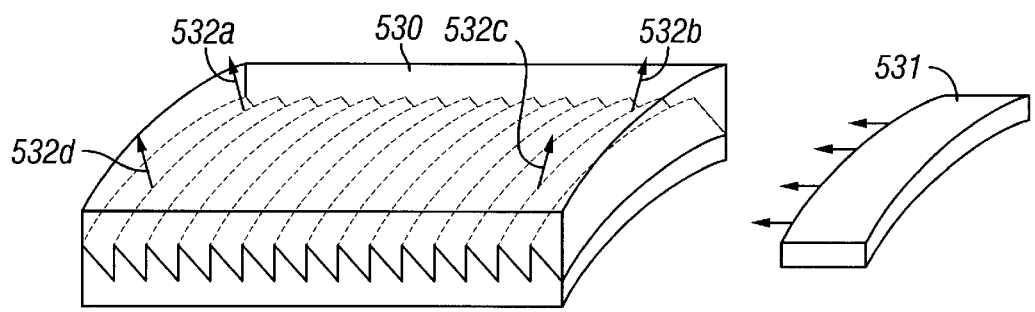
FIG. 53 is a perspective view of a curved sawtooth ejector pumped by a curved linear emitter.
Figure 54:
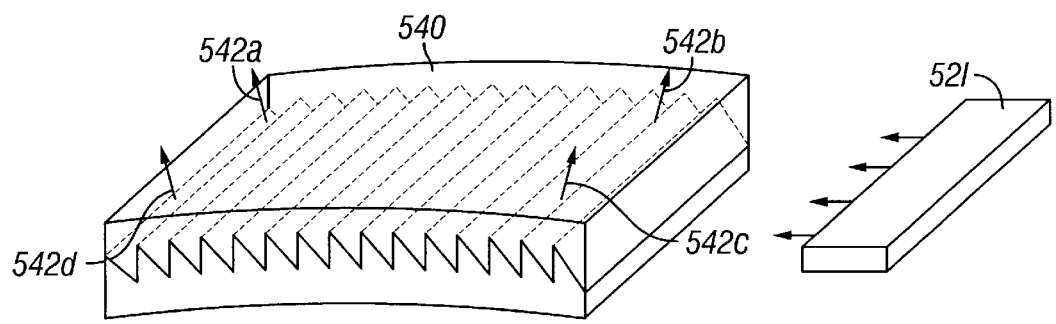
FIG. 54 is a perspective view of a longitudinally curved sawtooth ejector pumped by a linear emitter.
Figure 55:
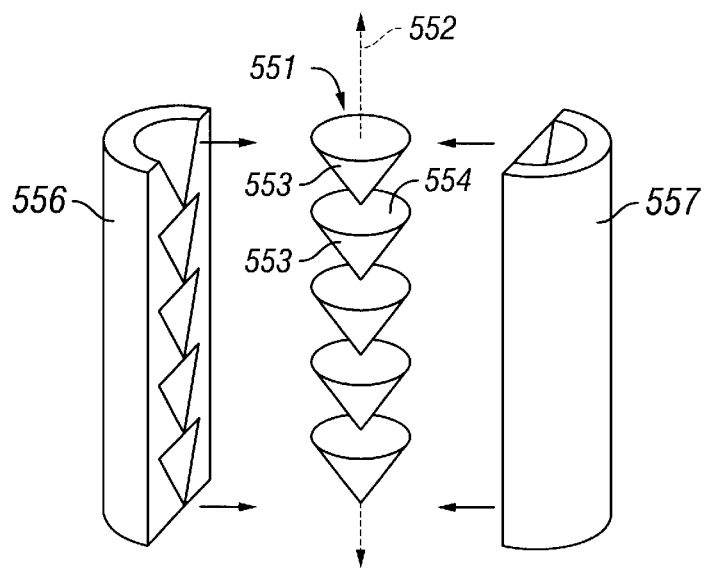
FIG. 55 is an exploded cross-sectional view of a rotationally-symmetric sawtooth ejector.
Figure 56:
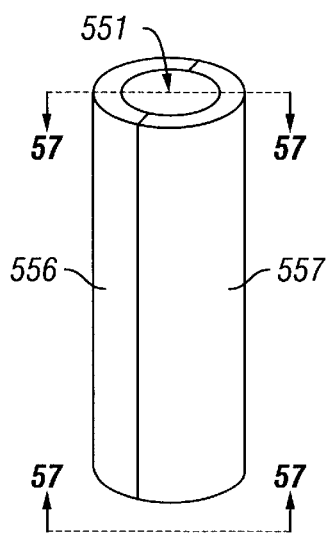
FIG. 56 is a perspective view of an assembled rotationally-symmetric sawtooth ejector.
Figure 57:
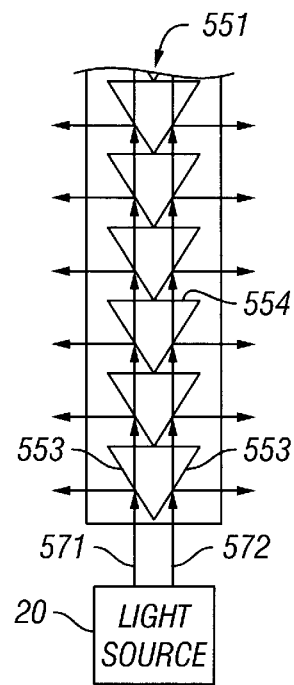
FIG. 57 is a cross-sectional view of an assembled rotationally-symmetric sawtooth ejector as in FIG. 56 with ray tracing.

Reference is now made to FIGS. 50–57, which illustrate embodiments of an emitter constructed using a sawtooth configuration, in which components are formed separately and then the two or more sides are bonded together to form a series of partially reflective surfaces that define the structure of an emitter described herein. In one embodiment partial reflectance is provided by Fresnel reflection, and in such embodiments the interstitial areas (the areas between the central structure and the outer shell) must be filled with a material that has a different index of refraction, such as an adhesive. Furthermore, the interstitial areas should be substantially free of air gaps. One advantage of such a structure is that it is relatively easy to manufacture. For example, using mass production techniques each side can be separately molded and polished (where appropriate), and then the two sides can be assembled using an adhesive that has the desired index. Various configurations are possible: a linear, two-dimensional, or three-dimensional configuration such as shown in FIGS. 50, 51, 52, 53, 54, and 55, or a rotationally symmetrical configuration as shown in FIGS. 55, 56, and 57.

Figure 50:
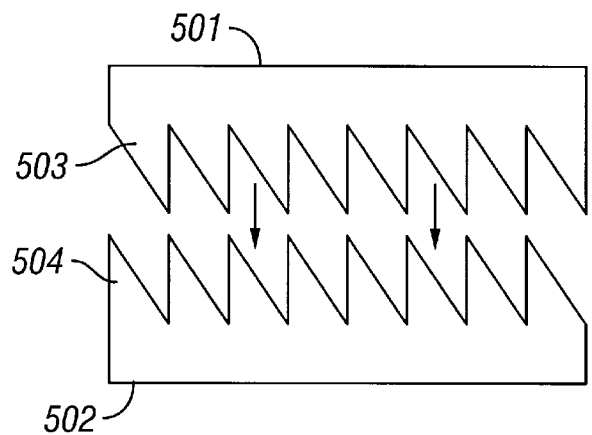
FIG. 50 is an exploded cross-section of a sawtooth ejector.

FIG. 50 is an exploded cross-sectional view of a linear emitter constructed according to the sawtooth embodiment, including an upper plate 501 and a lower plate 502, each formed with a sawtooth array that includes a plurality of parallel sawtooth structures; particularly, the upper plate 501 comprises a plurality of downwardly facing teeth 503, and the lower plate 502 comprises a plurality of upwardly facing teeth 503 that engage with the teeth on the upper plate 501. Each plate is formed separately and polished (where appropriate) using for example injection molding processes.

Figure 51:
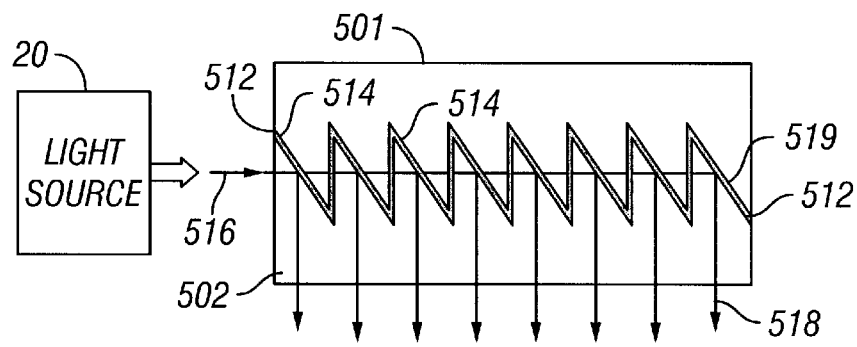
FIG. 51 is an assembled cross-section of a sawtooth ejector.

FIG. 51 is a cross-sectional view of an assembled unit 510 in which the upper plate 501 is engaged with the lower plate 502. At the interface between the upper and lower plates, a suitable material 512 is disposed to provide the desired reflective properties from angled surfaces 514, for example a glue having a predetermined index of refraction in order to provide the desired Fresnel reflection. In such an embodiment the upper and lower plates have an index of refraction that is approximately equal, and they may comprise similar materials. In alternative embodiments the angled surfaces 514 (i.e. the surfaces that define a nonzero angle with the incoming rays) may be coated with a metallic or a dielectric to provide partial reflectance. As shown in FIG. 51 a light ray 516 entering from the left is reflected partially from each of the angled surfaces 514 that it encounters to provide an output beam 518, but is transmitted through the orthogonal surfaces substantially unchanged in a direction. At the end of the sawtooth array the last angled surface 519 may comprise a full reflector to reflect any remaining light out of the emitter.

Figure 52:
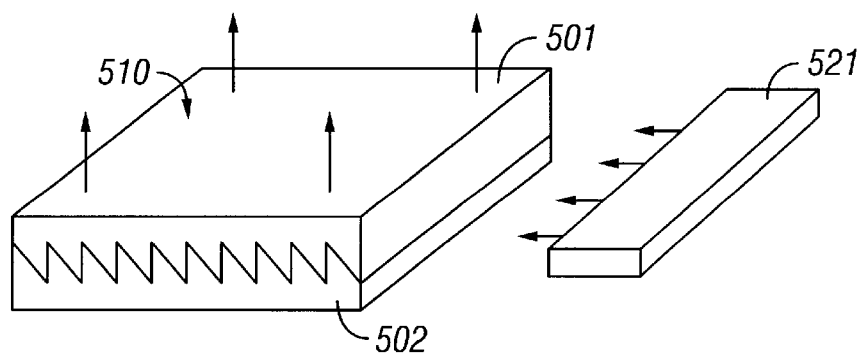
FIG. 52 is a perspective view of a sawtooth ejector pumped by a linear emitter.

FIG. 52 is a perspective view showing an assembled two-dimensional area emitter 510 constructed according to the sawtooth embodiment. A linear emitter 521, such as a laser diode with a collimating fiber lens, is situated to inject substantially collimated light into the sawtooth ejector.

FIGS. 53 and 54 illustrate alternative embodiments of a two-dimensional sawtooth area emitter. FIG. 53 shows an area emitter 530, pumped by a light source 531. The emitter 530 has a curve extending along the length of each sawtooth; particularly, the axis perpendicular (transverse) to the axis of propagation is curved, providing an area emitter 530 that emits light from an area that has an approximately cylindrical surface section as exemplified by rays 532a, 532b, 532c, and 532d. In order to efficiently inject light into the two-dimensional array, the light source 531 has a curve that corresponds to the curve of the area emitter; for example a series of point sources such as laser diodes can be arranged in a curve that provides the light source.

In one embodiment the area emitter has an outer cylindrical surface that corresponds to the curve of the sawtooths from which the reflected light is emitted. In such an embodiment the light reflected from the curved angled surfaces exits approximately normal to the cylindrical surface. In alternative embodiments, the outer surface of the emitting plate may have a shape that optically transforms the output beam in some way. For example, such alternative embodiments may have an outer surface that has a non-cylindrical curve. In still other embodiments the area emitter may include features on its outer surface that provide optical processing, such as a lens or a diffuser.

FIG. 54 is a second alternative embodiment, comprising a sawtooth area emitter 540 that is curved longitudinally; i.e. the emitter 54 is curved along the axis of propagation. In this embodiment, the light source 521 is linear, and emits a line of light into a longitudinally curved sawtooth array. In operation, propagating light is reflected from the angled surfaces and propagates through the flat surfaces and exits as exemplified by rays 542a, 542b, 542c, and 542d. Due to the curve of the sawtooth array, eventually light will travel off the curved sawtooth array if the light is not reflected from one of the angled surface. However, due to total internal reflection resulting from the small angle at which it intersects the outer surface of the emitter, the light will reflect back into the sawtooth array.

The curves of the sawtooth array and the outer surface of the emitter may be adapted in a variety of ways to fit a number of requirements. For example, the outer surface may provide a spherical or other similar three-dimensional surface. By varying the amount of curvature along one or both of the axes, a wide variety of emitter shapes can be designed and implemented.

Typically, in the sawtooth ejector embodiments, the non-emitting side of the emitter (i.e., the side opposite the emitting surface) is coated with a reflective material to reflect light in a direction back toward the emitting surface, thereby providing greater efficiency. Furthermore, the end opposite the injection surface can be designed to reflect light back toward the sawtooth array; for this purpose this opposite end can comprise a reflector, turning mirror, retarding device, or any other suitable device. This sawtooth embodiment can employ all of the enhancements and variations described in this application, such as retarders, turning reflectors and so forth, which can be used to provide increased efficiency of emission.

Rotational Sawtooth Ejector

FIGS. 55, 56 and 57 show an embodiment of a rotationally symmetric sawtooth ejector.

FIG. 55 is an exploded cross-sectional view of a rotationally-symmetric sawtooth ejector, showing a center unit 551 comprising a plurality of solid conical structures, one on top of the other, formed as a single component that is rotationally symmetrical about a central axis 552. Particularly the central axis 552 extends through the center of each of the cones. Each conical structure includes a conical surface 553 that provides an angled surface and an upper flat surface 554 that is approximately perpendicular to the central axis 552. An outer shell is formed in two sections, including a first outer section 556 and a second outer section 557 that are designed to engage with and enclose the central section 551. Particularly, the first and second outer sections 556 and 557 each have an inner surface that is formed, molded or otherwise shaped to engage with the multi-conical central unit 551. The outer surface of the outer shell (i.e. the outer surface of the assembled outer sections) in this embodiment are cylindrical.

FIG. 56 is a perspective view of the rotationally symmetrical emitter of FIG. 55, assembled together, and FIG. 57 is a longitudinal cross-section of the emitter shown in FIG. 56. Both the multi-conical central unit 551 and the outer shell comprise a material having substantially the same index of refraction. It may be advantageous to use the same material for each of the outer shell and the multi-conical central unit 551. At the interface between the inner structure and the outer housing, (and particularly between the cone surface 553 and the adjacent section of the outer shell) a material is disposed that provides a partial reflectance at the angled interfaces provided by the conical surfaces 553. In one embodiment, an adhesive having a different index of refraction is utilized in order to provide the Fresnel reflection. This is particularly important at the conical surfaces 553, but is not important at the flat upper surface 554, where reflection is generally not desirable. In alternative embodiment, coatings may be provided at the angled interfaces defined by the cones 553, such as metallic or dielectric coatings.

The cross-sectional view of the rotational emitter in FIG. 57 shown the cones engaged within the outer shell, and a ray tracing of first and second rays 571 and 572. In operation, light propagating parallel to the central axis 552 (FIG. 55) of the cylinder is reflected outwardly from the angled surfaces 553 of the conical structures, resulting in a rotationally symmetrical emission from the cylindrical outer shell. As can be seen from FIG. 57, first and second collimated light rays 571 and 572 entering the upper flat surface are partially reflected due to partial reflection from each of the angled surfaces 552 defined by the cones and thereafter exit from the outer housing to provide the exit light rays. The portion of the light not reflected continues on through the next flat surface and then is partially reflected at the next angled surface. The process continues for each of the succeeding angled surfaces. In any particular embodiment, a large number of angled surfaces may be utilized (corresponding to a large number of cones in the inner structure.

This rotational emitter embodiment can employ all of the enhancements and variations described in this application, such as retarders, turning reflectors and so forth, which c an be used to provide increased efficiency of emission.

In summary, in the sawtooth embodiments, light rays are partially reflected at each of a plurality of angled partially reflective interfaces, while propagating though the flat surfaces without substantial reflection. Each interface comprises an appropriate material designed to reflect a portion of the light while transmitting another portion of the light. In some embodiments, a large number of sawtooths (e.g., 25 to 100) may be utilized. One major advantage of the sawtooth configuration is its suitability for mass manufacturing at a relatively low cost. The sawtooth embodiment can employ all of the enhancements and variations described in this application, such as retarders, turning reflectors and so forth, which can be used to provide increased efficiency of emission.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A light ejector for ejecting substantially collimated light injected by a light source, comprising:
    a plurality of partially reflective interfaces arranged along a central axis, said partially reflective interfaces also arranged symmetrically at a nonzero angle with respect to the central axis, so that substantially collimated light injected by said light source in a direction approximately longitudinally along said central axis travels through each of said partially reflective interfaces, providing an area light output comprising light reflected from each of said partially reflective interfaces.

2. The light ejector of claim 1 wherein said partially reflective interfaces comprise means for providing Fresnel reflectance.

3. The light ejector of claim 1 wherein said partially reflective interfaces comprise metallic coatings that provide partial reflectance.

4. The light ejector of claim 1 wherein the length between adjacent interfaces is at least long enough that light reflected from any of said interfaces does not interact with any adjacent interface.

5. The light ejector of claim 1 wherein said ejector comprises a cylindrical configuration.

6. The light ejector of claim 1 wherein said ejector comprises a rectangular block configuration.

7. The light ejector of claim 1 wherein said ejector comprises an N-sided polygonal configuration.

8. The light ejector of claim 1 further comprising a plurality of stacked cones, each cone comprising a male end and a female end, said plurality of cones stacked so that the junction between a male end of one cone and a female end of an adjacent cone defines said partially reflective interface.

9. The light ejector of claim 8 wherein said cones have a first index of refraction, and further comprising a material disposed between adjacent male and female ends of said cones that fills an interstitial gap between the male and female ends, and has a substantially different, second index of refraction, so that said partially reflective interfaces provide Fresnel reflectance.

10. The light ejector of claim 8 wherein said partially reflective layer comprises a partially reflective metallic layer that fills an interstitial gap between said male and female ends.

11. The light ejector of claim 8 wherein said cones comprise a cylindrical configuration.

12. The light ejector of claim 8 wherein said cones comprise a rectangular block configuration.

13. The light ejector of claim 8 wherein said cones comprise an N-sided polygonal configuration.

14. The light ejector of claim 1 wherein said partially reflective interfaces comprise a zigzag configuration, each interface comprising an inner interface proximate to the central axis and an outer interface distal from said central axis, said inner interfaces angled to eject light traveling in a first longitudinal direction, and said outer interfaces angled oppositely to eject light traveling in a second, opposite longitudinal direction.

15. The light ejector of claim 14 wherein said light ejector comprises a cylindrical configuration, and said light source provides an annular beam that is injected into said outer interfaces along said second direction, and further comprising a turning reflector formed on the ejector on the side opposite the light source, said turning reflector having a configuration to reverse direction of said injected beam along said first direction and redirect it into the inner interfaces.

16. The light ejector of claim 1 further comprising a turning reflector formed on the ejector on the side opposite the light source, said turning reflector arranged to reverse the direction of light incident thereon.

17. The light ejector of claim 16 further comprising a polarization retarder situated to rotate the polarization of said longitudinally traveling light.

18. The light ejector of claim 17 wherein said polarization retarder comprises an optically active material.

19. The light ejector of claim of claim 17 wherein said polarization retarder comprises one of a Kerr device, a Pockels device, and a Faraday effect device.

20. The light ejector of claim 17 wherein said turning reflector and polarization retarder comprise a grooved reflector.

21. The light ejector of claim 20 wherein said grooved reflector comprises a spiral configuration.

22. The light ejector of claim 20 wherein said grooved reflector comprises a plurality of parallel grooves.

23. The light ejector of claim 20 wherein the direction of the grooves is obtained by calculating the line integrals of the vector field that forms 45° with the direction of dominant polarization of the incident light.

24. The light ejector of claim 1 wherein said ejector comprises a stripe ejector in which said partially reflective interfaces are parallel and angled to provide an output configuration in the shape of approximately a stripe.

25. The light ejector of claim 24 further comprising an edge-lit holographic optical component arranged to receive said stripe output and direct it to an LCD display, thereby front lighting said LCD display.

26. The light ejector of claim 1 wherein said interfaces are formed in a sawtooth configuration, said ejector including an upper plate that has a plurality of rows of teeth, and a lower plate that has a plurality of rows of teeth that engage with the teeth in the upper plate.

27. The light ejector of claim 1 further comprising an annular reflector arranged around said ejector to receive said area light output from said ejector and redirect it to provide an emitter.

28. An optical system for ejecting light supplied from a small light source comprising:
    an ejector comprising a plurality of partially reflective interfaces arranged at a nonzero angle with respect to a central axis; and
    a light injector comprising an optical system arranged to inject substantially collimated light from said light source into said ejector in a direction approximately longitudinally along said central axis so that said injected light travels through each of said partially reflective interfaces, thereby providing an area light output comprising light reflected from each of said partially reflective interfaces.

29. An area emitter that collects light from one or more light sources and reflects it from a plurality of partially reflective interfaces that collectively define an ejector of optical radiation providing an area light output of substantially collimated optical radiation.

30. A light ejector for transversely ejecting substantially collimated light injected by a light source, comprising:

a plurality of partially reflective interfaces arranged along a central axis, said partially reflective interfaces also arranged symmetrically at a nonzero angle with respect to the central axis, so that substantially collimated light injected by said light source in a direction approximately longitudinally along said central axis travels through each of said partially reflective interfaces, providing an area light output comprising light reflected from each of said partially reflective interfaces;

a turning reflector formed on the ejector on the side opposite the light source, said turning reflector arranged to reverse the direction of light incident thereon; and a polarization retarder situated to rotate polarization of longitudinally traveling light.

31. The light ejector of claim 30 wherein said polarization retarder comprises an optically active material.

32. The light ejector of claim of claim 30 wherein said polarization retarder comprises one of a Kerr device, a Pockels device, and a Faraday effect device.

33. The light ejector of claim 30 wherein said turning reflector and polarization retarder comprise a grooved reflector.

34. The light ejector of claim 33 wherein said grooved reflector comprises a spiral configuration.

35. The light ejector of claim 33 wherein said grooved reflector comprises a plurality of parallel grooves.

36. The light ejector of claim 33 wherein the direction of the grooves is obtained by calculating the line integrals of the vector field that forms 45° with the direction of dominant polarization of the incident light.

* * * * *